Jan. 5, 1954

N. R. FRIEBERG ET AL 2,665,063

SYMBOL-PRINTING MECHANISM

Filed June 29, 1950

14 Sheets-Sheet 1

NELSON R. FRIEBERG
& OSCAR F. LARSEN
INVENTORS

BY Earl Beust
Justin S Compton

THEIR ATTORNEYS

NELSON R. FRIEBERG
& OSCAR F. LARSEN
INVENTORS
BY
Earl Beust
Justin S Compton
THEIR ATTORNEYS NELSON R. FRIEBERG
& OSCAR F. LARSEN
INVENTORS
BY Carl Beust
Justin [signature]
THEIR ATTORNEYS Jan. 5, 1954 N. R. FRIEBERG ET AL 2,665,063

SYMBOL-PRINTING MECHANISM

Filed June 29, 1950 14 Sheets-Sheet 4

NELSON R. FRIEBERG
& OSCAR F. LARSEN
INVENTORS

BY Pearl Burst
Justus Lampton

THEIR ATTORNEYS

Jan. 5, 1954 N. R. FRIEBERG ET AL 2,665,063

SYMBOL-PRINTING MECHANISM

Filed June 29, 1950 14 Sheets-Sheet 5

NELSON R. FRIEBERG
& OSCAR F. LARSEN
INVENTORS

BY Carl Beust
Justin S. Compton
THEIR ATTORNEYS

SYMBOL-PRINTING MECHANISM

Filed June 29, 1950 14 Sheets-Sheet 6

NELSON R. FRIEBERG
& OSCAR F. LARSEN
INVENTORS
BY Earl Beust
Justin S Rawlston
THEIR ATTORNEYS NELSON R. FRIEBERG
& OSCAR F. LARSEN
INVENTORS
BY Carl Beust
Justin S Lumpton
THEIR ATTORNEYS NELSON R. FRIEBERG
& OSCAR F. LARSEN
INVENTORS
BY Earl Beust
Justin W. Johnston
THEIR ATTORNEYS NELSON R. FRIEBERG
& OSCAR F. LARSEN
INVENTORS
BY Carl Beust
Justin S. Coulston
THEIR ATTORNEYS NELSON R. FRIEBERG
& OSCAR F. LARSEN
INVENTORS
BY Carl Beust
Justin S. Compton
THEIR ATTORNEYS

NELSON R. FRIEBERG
& OSCAR F. LARSEN
INVENTORS

BY Earl Beust
Justin S. Compton
THEIR ATTORNEYS

SYMBOL-PRINTING MECHANISM

Filed June 29, 1950 14 Sheets-Sheet 12

NELSON R. FRIEBERG
& OSCAR F. LARSEN
INVENTORS
BY Earl Beust
Justin L. Compton
THEIR ATTORNEYS NELSON R. FRIEBERG
& OSCAR F. LARSEN
INVENTORS
BY Earl Beust
Justin S. Kompton
THEIR ATTORNEYS Jan. 5, 1954

N. R. FRIEBERG ET AL 2,665,063

SYMBOL-PRINTING MECHANISM

Filed June 29, 1950

14 Sheets-Sheet 14

NELSON R. FRIEBERG
& OSCAR F. LARSEN
INVENTORS

BY Earl Benst
Justin S Compton

THEIR ATTORNEYS

Patented Jan. 5, 1954 2,665,063

UNITED STATES PATENT OFFICE 2,665,063

SYMBOL-PRINTING MECHANISM

Nelson R. Frieberg and Oscar F. Larsen, Ithaca, N. Y., assignors to The National Cash Register Company, Dayton, Ohio, a corporation of Maryland Application June 29, 1950, Serial No. 171,119

17 Claims. (Cl. 235—60.17)

This invention relates to a calculating machine and more particularly pertains to symbol printing and operation control mechanism for a machine capable of receiving items additively or subtractively, with provision for printing true positive or negative totals or sub-totals.

The machine is fully automatic in that a "total" key is provided which, when operated, causes the true total to be printed, with an appropriate symbol, without any other action being required of the operator, whether the total be positive or negative. The same is true of a "sub-total" key which only has to be operated to cause the true sub-total to be printed, be it positive or negative.

The differential mechanism includes stop bars, differential racks, and printer setting mechanism of the basic construction shown in the Heber C. Peters United States Patent No. 1,386,021.

The transfer mechanism is a modified novel form of that shown in the above-mentioned Peters patent, being adapted for subtract operations.

The digit keyboard is substantially like that disclosed in the Charles Schroder United States Patent No. 2,062,731.

Novel mechanism is provided for automatically controlling the taking of a total, be it positive or negative, by operation of a single total control key.

Symbol-printing mechanism of novel construction has been provided for printing a "clear" symbol on the first item entry following a total if it be an add entry, even if preceded by a non-add operation.

Another object of the invention is to provide other novel mechanism for setting operation designating symbol type to a printing position.

Novel means is provided to print zeros in the units and tens orders on total-taking operations when the totalizer is already at zero.

With these and incidental objects in view, the invention includes certain novel featuers of construction and combinations of parts, a preferred form or embodiment of which is hereinafter described with reference to the drawings which accompany and form a part of this specification.

Of the drawings:

Fig. 1 is a perspective view of the machine with the casing on;

*General description*

Figure 1:
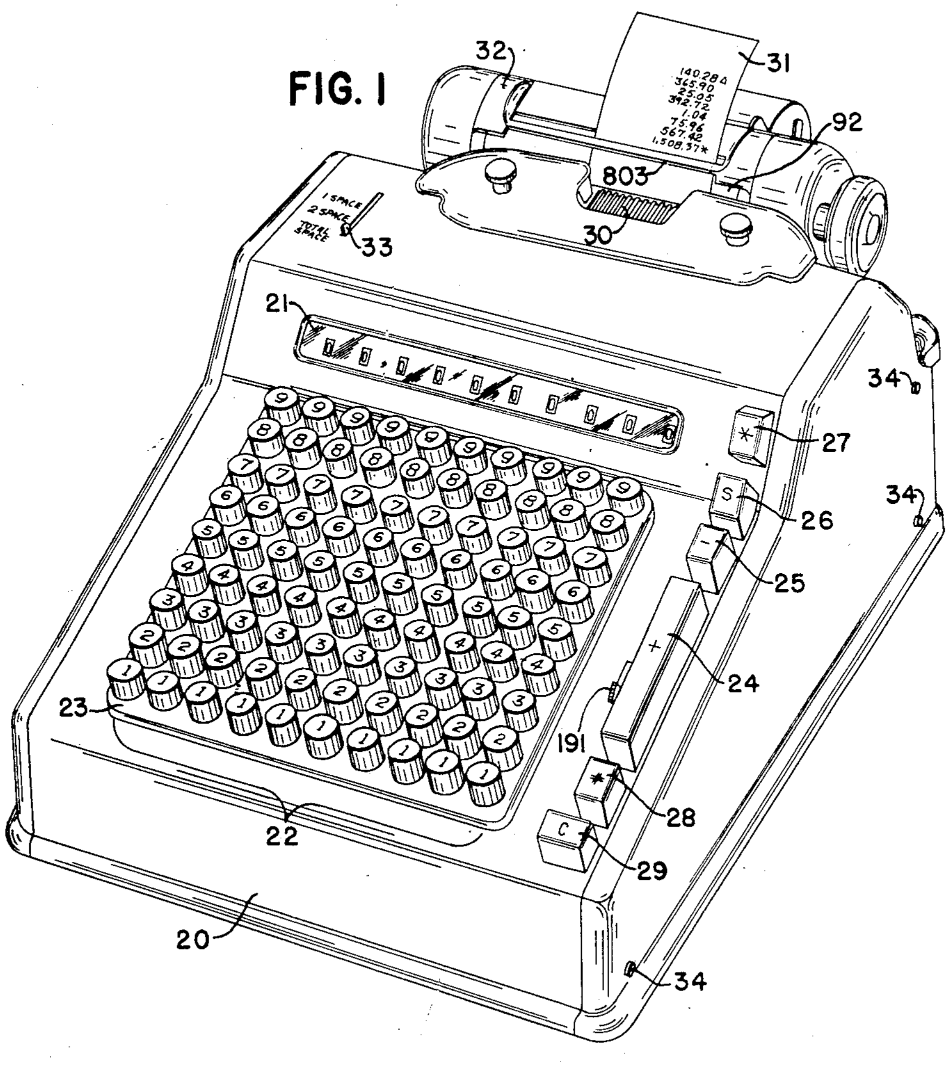

The machine is housed in a casing 20 (Fig. 1) having a viewing aperture 21 covered by glass through which number wheels attached to the totalizer pinions may be seen. There are ten denominational orders of digit-representing keys 22 projecting through a dust plate 23 in the casing. Items to be added or subtracted are set up on the keyboard and the machine is set in operation by pressing the "add" control key 24, if an add operation is desired, or by pressing the "subtract" control key 25, if a subtract operation is desired. A total-taking operation is initiated by depressing "total" control key 27. If a sub-total operation is desired key 26 is depressed. Key 28 is a "non-add" control, depression of which causes the printing of any number set up on the keyboard but does not enter it into the totalizer. Key 29 is a "correction" control used to release any depressed digit keys. A set of type bars 30 prints items, totals and symbols on a tape 31 held in a paper carriage 32. Lever 33 is adjusted to "single-space," "double-space" or "total-space" position to control the extent of paper feed.

The machine automatically takes and prints true negative totals as well as positive totals, has a distinctive mark printed after the first entered item after a total has been taken, prints negative entries, negative sub-totals and negative totals in a distinctive color, red, and has appropriate symbols following totals, sub-totals and negative entries, negative sub-totals and negative totals. The casing is secured to the machine framework by screws 34.

*Machine drive*

The machine drive, including the motor, motor switch, tripping mechanism and single revolution clutch mechanism is substantially the same as that disclosed in United States Patent No. 2,428,084 which issued on the application of Harry L. Lambert.

The motor starting switch tripping mechanism is not shown in full detail herein, but sufficient is given for an understanding of the invention. For further details reference may be had to the Lambert patent.

The machine is driven through one cycle of operation on add or subtract operations and through two cycles of operation on total taking or sub-total taking operations. One cycle consists of the rocking of shaft 55 (Fig. 5) first clockwise then counter-clockwise by motor 35. In two cycle operations the motor switch is kept closed during the reset movement of the motor switch controls at the end of the first cycle, as will be explained.

When the motor switch is tripped it is accompanied by the counter-clockwise turning of shaft 36, and three-armed lever 37 secured thereto, through the action of spring 38 anchored to the lever 37 by stud 44 and to the machine framework by stud 39 on plate 40 secured to left vertical side frame plate 72 by screws 41, 42 and 43. The relatching of the motor switch must be against the tension of spring 38. As the motor runs it turns shaft 45 counter-clockwise through reduction gearing. Shaft 45 has a notched drive wheel 45a secured thereto behind crank plate 46 loosely mounted on the shaft. Drive pawl 47 pivoted on plate 46 by stud 48 is urged in an engaging direction toward the notched drive wheel by spring 49 anchored to the pawl and to stud 50 on plate 46 but is disengaged therefrom when the machine comes to rest by reason of stud 64 bearing against surface 63 on the rearwardly extending arm of pawl 47. However, as soon as lever 37 rocks counter-clockwise and the motor starts, pawl 47 is released and engages the notched drive wheel 45a, rotating crank plate 46 counter-clockwise. Shaft 55 has loosely mounted thereon a crank 54 connected to plate 46 by stud 51, connecting link 52 and stud 53. Crank 54 is coupled to the main drive shaft 55 by a yielding driving connection including lever 56, pivoted on stud 53, and a roller 57 mounted on the outer end of the lever. The roller is urged by a strong spring 58 into a notch 59 in the edge of a plate 60 secured to shaft 55. Spring 58 is strong enough to hold roller 57 in the notch to form a driving connection between crank 54 and shaft 55 during all normal operations of the machine. The driving connection will yield, however, to any overload placed on the main drive shaft. As crank lever 46 is about to complete a rotation, a cam arm 61 secured thereto strikes roller stud 62 on lever 37 rocking it clockwise to normal position in which position it is latched in single cycle operations. As crank lever 46 nears home position pawl 47 is rocked clockwise on stud 48 as surface 63 strikes stud 64. On two cycle operations lever 37 is not latched in normal position at the end of one cycle as it is knocked clockwise by arm 61 but immediately returns to its counter-clockwise position before it has a chance to disengage pawl 47. On two cycle operations the lever 37 is latched in normal position after two cycles of operation. Whenever lever 37 moves to and is latched in normal position the motor switch contacts are opened permitting the rotor thereof to coast to a stop disconnected from crank lever 46.

Figures 6, 7, 8:
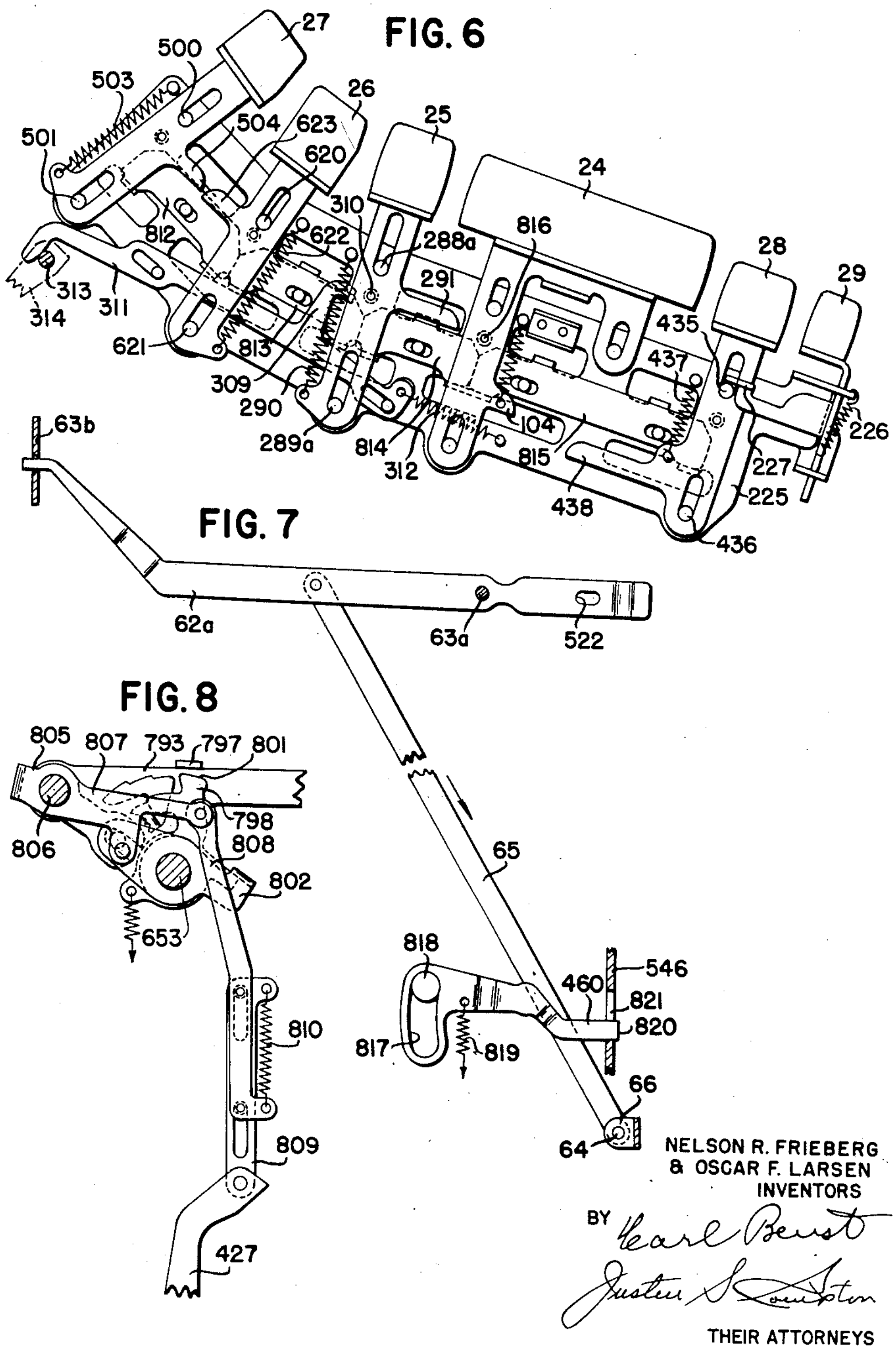
Fig. 6 is a view of the control key bank secured to the right inside wall of the casing as viewed from the inside.
Fig. 7 is a top plan view of the machine tripping linkage across the under side of the machine.
Fig. 8 is a view of the right side mechanism for giving the platen an extra paper feeding movement on total-taking operations.

Fig. 7, in part, shows the control linkage by which lever 37 is unlatched and held unlatched for one or two machine cycles under control of mechanism on the right side of the machine. Lever 62*a* pivoted on vertical stud 63*a* on a frame member on the under side of the machine engages unlatching member 63*b* when lever 62*a* is rocked counter-clockwise slightly through movement of link 65 in the direction of the arrow. That movement of link 65 is brought about through a pivot connection 64 to the bent-over end 66 of one arm 67 (Fig. 3) of a bell crank lever 68 pivotally mounted on screw stud 69 mounted in a boss 70*a* (Fig. 4) extending outwardly from the right side vertical frame plate 70 of the machine. Rocking crank lever 68 slightly clockwise from the normal position shown in Fig. 3, against the counter-urge of spring 71 will set the machine to cycling and it will continue to do so until crank lever 68 is returned to normal position.

On add operations lever 103 is rocked down and stud 106 in turn rocks bell crank lever 107 mounted on stud 493 clockwise carrying with it lever 68 to which it is coupled by spring 108.

Referring again to Fig. 3, the drive shaft 55 extends across the rear end of the machine and in one machine cycle rocks first counter-clockwise and then clockwise to actuate the differential, control mechanism and printer.

*The differential*

Figure 2:
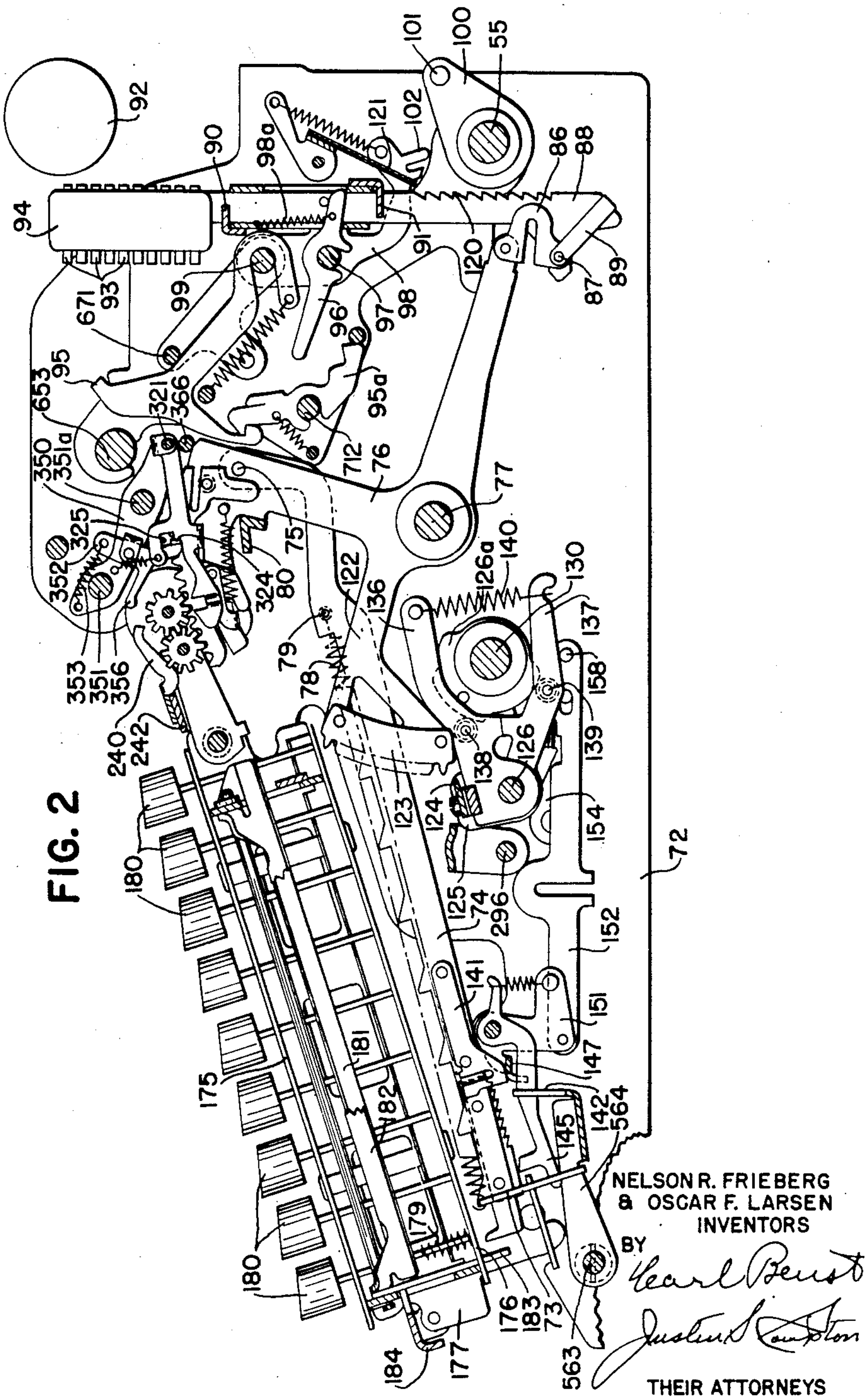
Fig. 2 is a vertical section, through a typical denominational order of the machine, from front to rear, showing the digit keyboard and the differential, totalizer, and printing mechanisms.

Secured between the front end of the right vertical side plate 70 (Figs. 3 and 4) and front end of the left vertical side frame plate 72 (Figs. 2 and 5) is a slotted plate or comb 73 (Figs. 2 and 5) in which the front ends of a series of denominational order stop bars are guided and supported for sliding motion. There is one stop bar for each denominational order. As the stop bars of all orders are constructed the same, a typical order only is shown in Fig. 2, as an example. Stop bar 74 is pivoted at the rear end by stud 75 to the upper extending arm of a three-armed diverging lever 76 pivotally mounted on shaft 77, and is normally urged forwardly by spring 78 stretched between a stud 79 and comb 73. The stop bar normally is held against forward movement by a bail 80, extending across the front of all the diverging levers and held between two arms pinned to shaft 77. The right arm 81 (Fig. 4) has a downwardly extending arm pivoted to a link 82 having rotatably mounted thereon a roller 83 which is held in engagement with the edge of a cam 84 pinned to drive shaft 55. The rear end of link 82 has a forked end 85 which embraces and rides shaft 55 for support. As shaft 55 rocks counter-clockwise shaft 77 will do likewise causing a forward and downward movement of bail 80 by reason of the urge given by the springs, like spring 78 (Fig. 2), urging the stop bars forward. On return movement of the bail 80, on the clockwise movement of shaft 55, the stop bars will be returned to the rest position of Fig. 2. A rearwardly extending arm of lever 76 is pivoted to one arm of a U-shaped adjusting link 86 the other arm of which is pivoted on a stud 87 of a printer arm 88 where it is retained by a spring clip 89. Printer bar 88 is adjusted vertically in slotted guides 90 and 91 with respect to the paper platen 92, shown diagrammatically, according to the selective positioning of three-armed diverging lever 76 under control of the digit keys to be described. Printer bar 88 has at the top end ten vertically spaced type 93 movable, individually, in a case 94, from the shown position toward the paper platen. The type are urged to the retracted position, shown, by springs within case 94 and the particular type at printing position is hit by printing hammer 95 when released from the cocked position, at printing time, by the tripping of a latch 95*a*. When a type bar is selectively raised to printing position an interponent 96 rocks counter-clockwise on bail 97 under urge of spring 98*a*. Bail 97 is secured between arm 98 pivoted on shaft 99 and another arm like 98 also pivoted on shaft 99. Bail 97 extends across the printer. Cam lever 100 on shaft 55 is rocked counter-clockwise and then clockwise during a machine operation and stud 101 thereon strikes the tail 102 on arm 98 rocking the bail and interponent toward latch 95*a* which is unlatched at mid-cycle, if the type bar 88 has been moved from home position, causing the printing hammer 95 to hit the type at the printing position. The described printing mechanism is duplicated in each denominational order except that the rearwardly extending arms of the three-armed diverging levers like lever 76, in order to connect to the associated type bars, which are crowded together as shown in Fig. 1 instead of being in line with the respective keybank denominations, are bent according to the relative lateral position between a stop bar and its associated type bar.

Means, to be described, is provided for printing zeros, to the right of the first significant digit in those columns in which a digit key has not been depressed, and to print zeros in the units and tens orders on total-taking operations when the totalizer is clear at that time.

The printing mechanism so far described is old, being described in the Peters Untied States Patent 1,386,021 to which attention has been directed. The rear lower end of each type bar has a series of notches 120 adapted to be engaged by a bail 121, on total-taking operations after printing and before disengagement of the totalizer from the differential, to prevent slamming of the differential to full operated condition. As such mechanism does not constitute a part of the invention the operating and timing mechanism for this bar has not been shown.

A forwardly projecting arm 122 of diverging lever 76 has mounted thereon an alining rack 123 the ten teeth of which pass in front of an alining bail 124, serving all denominational orders, which is rocked toward the rack 123 during the middle part of the machine cycle during totalizer engaging time to hold the lever 76 rigidly in set position. Alining bail 124 is held in a rockable frame including two side arms, the left one of which 125 is shown, and a bail support rod 126 connecting said side arms. The side arms are pivotally mounted on studs mounted on the inside of the vertical side plates 70 and 72. The alining bar assembly is rocked by cam 128a secured on cross shaft 130 journaled in side plates 70 and 72 and rocked counter-clockwise and then clockwise by drive shaft 55 (Fig. 3) through plate 131, pivot 132, link 133, pivot 134 and plate 135 pinned thereto. Returning to Fig. 2, scissor arms 136 and 137 pivotally mounted on cross bar 126 have studs 138 and 139, respectively, which are kept in contact with the edge of cam 128a by spring 140. The alining bar is set into scissor arm 136 which, when rocked, rocks the alining bar assembly. Cam 128a is so formed as to bring the alining bar into the rack shortly before mid-cycle. As the totalizer comes into engagement with the differential racks on the diverging levers, to be described, just before mid-cycle in item entering operations, the alining bar holds the racks in perfect adjustment insuring proper meshing of the teeth.

Figure 9:
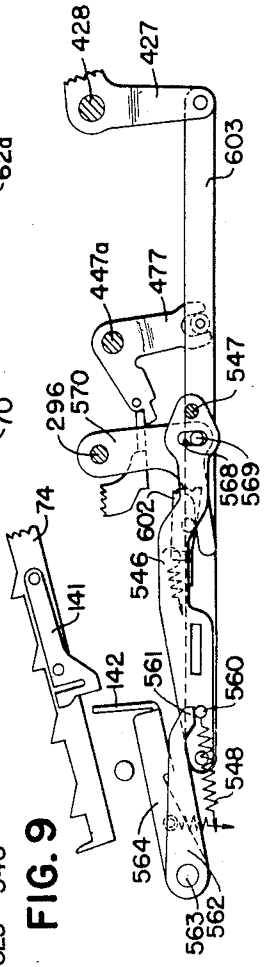
Fig. 9 shows the mechanism for holding the differential racks from movement during the first cycle of a total-taking operation.

On the side of stop bar 74 is an adjustable stop plate 141 the forward end of which strikes comb 73 to limit the forward movement of the stop bar. Referring to Fig. 9, stop plate 141 is engaged by bail 142, during the first cycle of total-taking operations, to hold the differential from movement, as will be described later.

Figure 11:
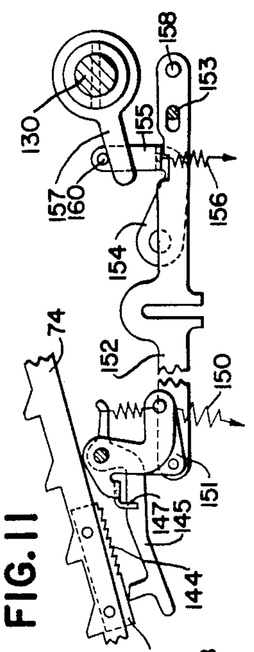
Figs. 10 and 11 show the anti-rebound mechanism of a typical differential rack.
Figure 10:
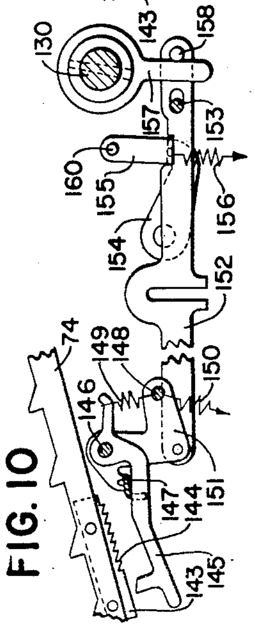

Referring to Figs. 10 and 11, there is a plate 143, secured to the stop bar 74, the lower edge of which has teeth 144 adapted to be engaged by pawl 145 which is raised thereagainst during the forward movement of the rack to prevent any rebound of the rack when it is suddenly halted by a key. Pawl 145 is rotatably mounted on shaft 146 extending between the vertical side frame plates and is held in a slot in a comb-like bail 147 extending across the machine. Bail 147 has two rearwardly extending arms between which is mounted a rod 148 to which is anchored a spring 149 whose other end is secured to a rearwardly extending arm of pawl 145. Thus the pawl and bail move together except that the pawl may rock counter-clockwise against the urge of spring 149. The assembly of pawl 145 and bail 147 normally is in the position shown in Fig. 11, as urged by spring 150 secured to the base of the machine. Pivoted to arm 151 of the bail is a link 152 having at its rear end an elongated slot through which passes a rod 153 extending from the left side plate 72. Pivoted to side plate 72 is a bell crank lever 154 having an offset in its upwardly extending arm 155 which is held against the upper edge of link 152 by spring 156. Movement of link 152 rearwardly allows the offset of arm 155 to drop into a locking notch which holds the link in rearward position until bell crank 154 is rocked counter-clockwise. Pinned to rock shaft 130 is a lever 157 having a normal position as shown in Fig. 11 and a moved position, as shown in Fig. 10, at mid-cycle. As shaft 130 rocks counter-clockwise during the first half of a machine cycle it strikes stud 158 moving link 152 rearwardly where it is latched by bell crank 154 at mid-cycle, holding pawl 145 out of contact with stop bar 74 so that stop bar may return to home position. During the first half cycle of machine operation pawl 145 has been clicking over teeth 144 to prevent a possible rebound of the stop bar. As lever 157 moves clockwise during the last half of the machine cycle it approaches and finally strikes stud 160 on bell crank lever 154, rocking it counter-clockwise, unlatching link 152 so it is returned to the position of Fig. 11. All the stop bars are controlled by the bail 147 and associated mechanism.

*The digit keyboard*

Figure 5:
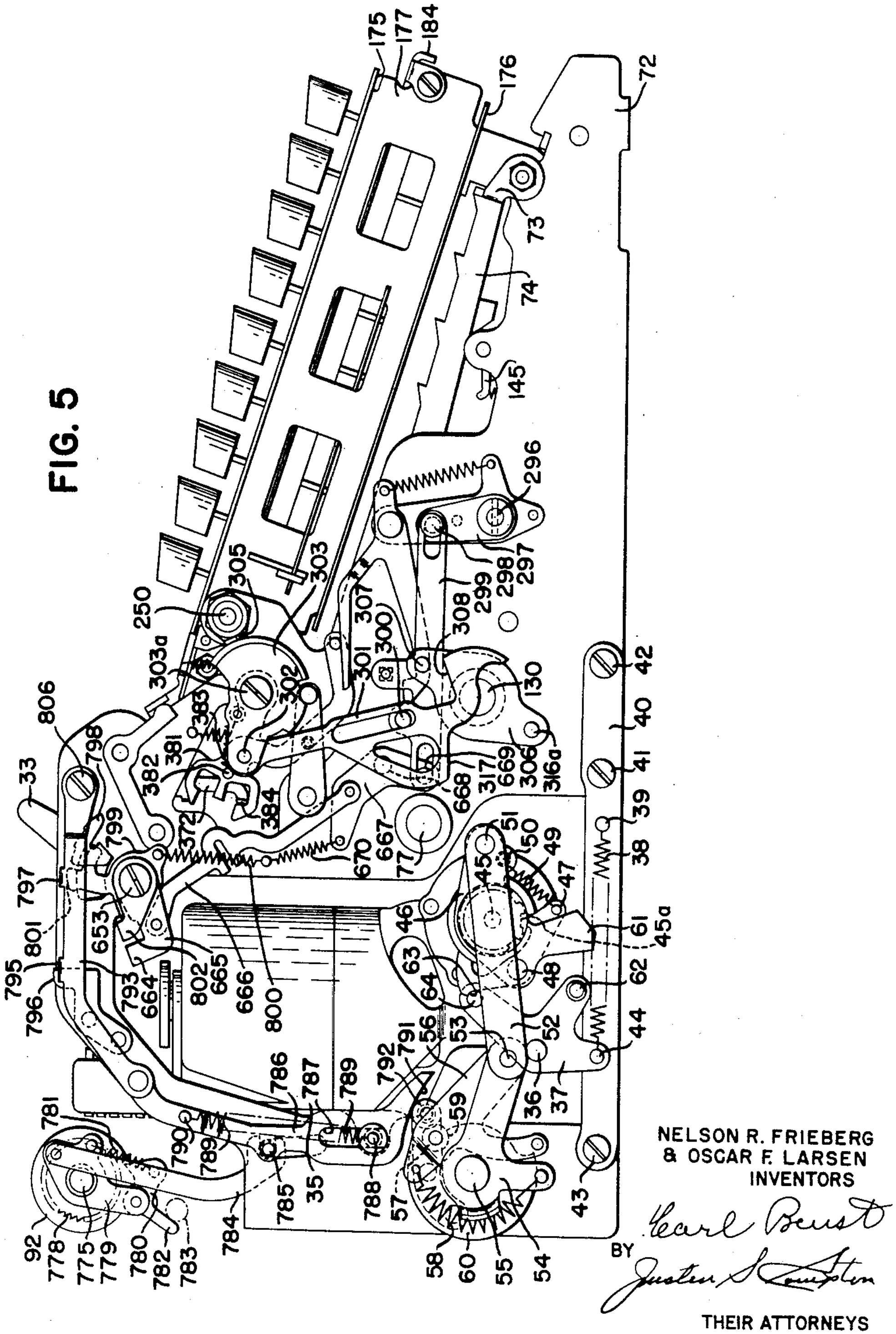
Fig. 5 is a view of the left side frame of the machine showing, especially, the motor drive, totalizer shifting, "fugitive" one control mechanism, and the paper feed mechanism.

The keyboard in which the digit keys for controlling the movement of the differentials are mounted has a main frame including a top plate 175 (Fig. 2), a bottom plate 176, a left side plate 177, and a right side plate 178 (see Fig. 5).

Figure 3:
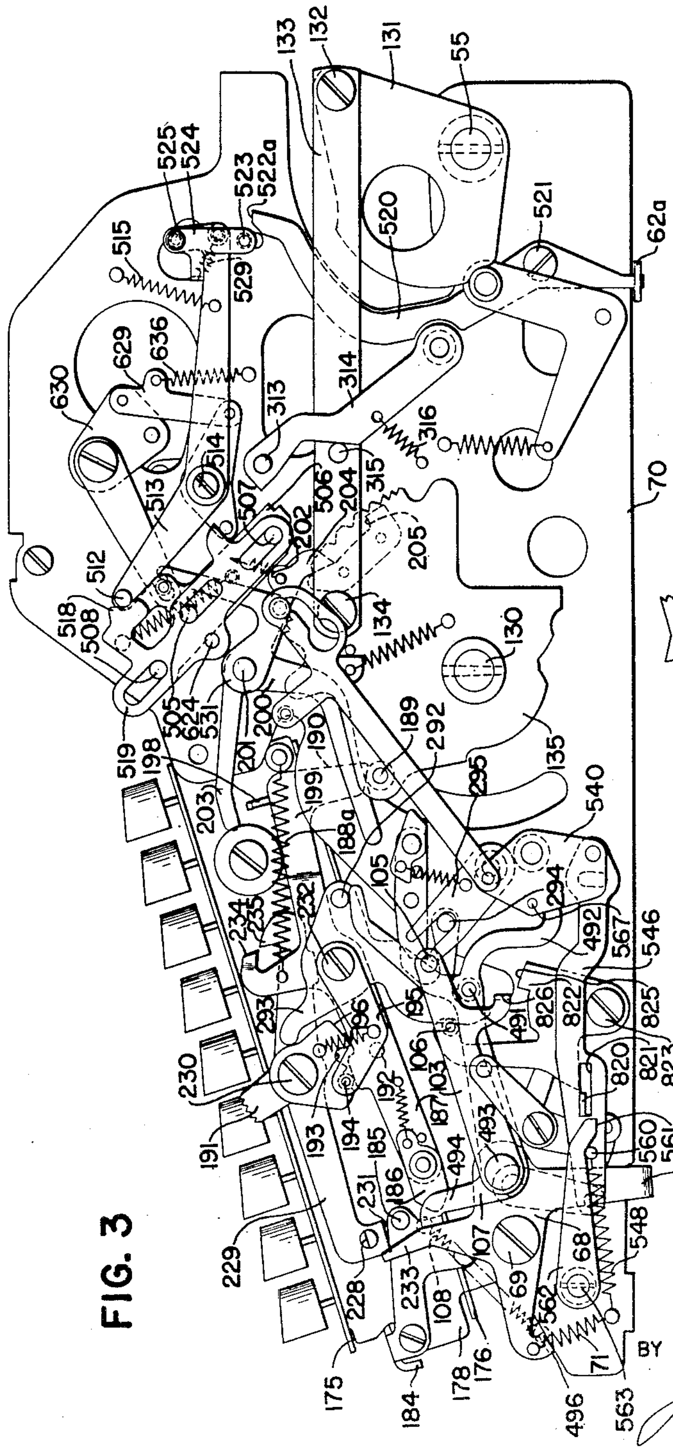
Fig. 3 is a view of the right side frame and the control mechanism on the outside thereof.

A typical denominational keybank column is shown in Fig. 2. The keys 180 have key stems slidably mounted in alined slots cut in the top and bottom plates and are normally held up in ineffective position by springs such as spring 179. Any depressed key has its key stem projecting below bottom plate 176 and is adapted to be struck by an associated one of teeth on stop bar 74 as it moves forward on the first half of an entry machine cycle. The extent of movement of stop bar 74 is proportional to the digit value of the key depressed. Each keybank has a zero stop bail 182 and a latching bail 181. When a key in the bank is depressed bail 182 is rocked to move a zero stop member 183 from a position in which it blocks any significant movement of the stop bar except that sufficient to move the type bar to zero printing position. Bail 181 latches any depressed key in depressed condition until unlatched by a rocking of bail 181 by depression of another key in the bank or by rocking of the key release bail 184 as stud 185 (Figs. 3 and 4) is struck downwardly by bypass pawl 186 (Fig. 3). By-pass pawl 186 is pivoted on lever 187 which is rocked clockwise on pivot 232, during the first half of a machine cycle, when pawl 186 by-passes stud 185, and counter-clockwise, during the second half of a machine cycle, when pawl 186 knocks stud 185 downwardly releasing the keys. Spring 188a normally urges lever 187 clockwise and its rocking excursion clockwise from the home position is permitted when roller stud 189 is moved from under its rearwardly and downwardly extending leg 190. Stud 189 is on plate 135, before described, and rocks back to home position, shown, at the end of a machine cycle at which time the keys are released, except on repeat operations wherein repeat lever 191 is rocked clockwise. In the normal position of repeat lever 191 stud 192 on lever 187 is free to move upwardly into notch 193 in lever 191 thus giving said lever 187 sufficient movement so by-pass pawl 186 passes stud 185. If lever 191 is rocked clockwise stud 194 on retaining pawl 195 normally in engagement in a front notch of lever 191 engages the rear notch 193 thereof, at which position edge 196 of lever 191 blocks movement of stud 192 and consequently the key release actuating lever 187 is not rocked by spring 188a. A locking bar 198 extends across the rear ends of all the keybanks and is resiliently urged toward the right such movement locking the digit keys from movement whether in depressed position or not, and such outward movement occurs when the tail 199 on key release actuating lever 187 moves from home position at the beginning of a machine operation. Return movement of lever 187 at the end of a machine operation forces locking bar 198 to inward position to permit selective depression of the digit keys for the next operation. In repeat operations there is sufficient clearance between edge 196 of lever 191 and stud 192 to permit lever 187 to rock clockwise a sufficient amount to lock the keys. To insure key locking bar 198 has functioned properly, a three-armed interlock lever 200 pivoted on stud 201 is urged counter-clockwise by a spring 202 acting on a rearwardly extending one of the three arms to hold a downwardly and forwardly extending arm against stud 189 in plate 135. In the home position of plate 135 the forward and upwardly extending arm 203 is above locking bar 198, but as soon as plate 135 rocks counter-clockwise in the first half of a machine cycle stud 189 becomes ineffective and allows arm 203 to drop toward locking bar 198 which is then moving outwardly as lever 187 rocks clockwise. Arm 203 continuing movement enters a notch in extended locking bar 198 to hold it in locking position during the remainder of the machine operation until stud 189 comes to home position. In the event locking bar 198 fails to move outwardly arm 203 does not complete its movement and the machine action is blocked by toe 204 hitting a formation 205 on a stop plate secured to the inside surface of plate 135. The action of arm 203 occurs every cycle of operation so a key cannot be depressed during a movement of the stop bars.

A manually operated key release is provided for releasing any depressed key except during a machine cycle and between cycles of a two-cycle operation. Correction key 29 (Fig. 6) slidably mounted inside the machine casing in alined slots in bent-over ears of bracket 225 normally is kept in the up position by spring 226 but may be depressed against its restoring action. A rearwardly extending arm thereof has a bent-over ear 227 which, when the casing is on the machine, is directly above a flattened surface on a stud 228 (Fig. 3) projecting from the front end of a lever 229 pivoted on screw stud 230. Counter-clockwise rocking of lever 229 by key 29 causes surface 231 thereof to strike stud 185 rocking bail 184 thus releasing the digit keys. Lever 229 normally is held with a surface on a rearwardly extending arm thereof resting on screw stud 232 by means of a spring, not shown. Rocking of lever 68 clockwise upon release of the machine for motor operation places arm 233 thereof under stud 228 preventing key-release movement of lever 229. Bent-over hook 234 on lever 187 engages surfaces 235 on the rearwardly extending arm of key release lever 229 to prevent its movement when the machine is operated by a crank rocking shaft 130 without rocking of motor release lever 68.

Reference is made to United States patent to Schroder 2,062,731 and to United States patent to Lambert 2,389,062 for a more detailed description of the digit key bank construction, the description given herein being sufficient for an understanding of the invention.

*The totalizer*

Figures 12, 13, 14, 15, 16, 17:
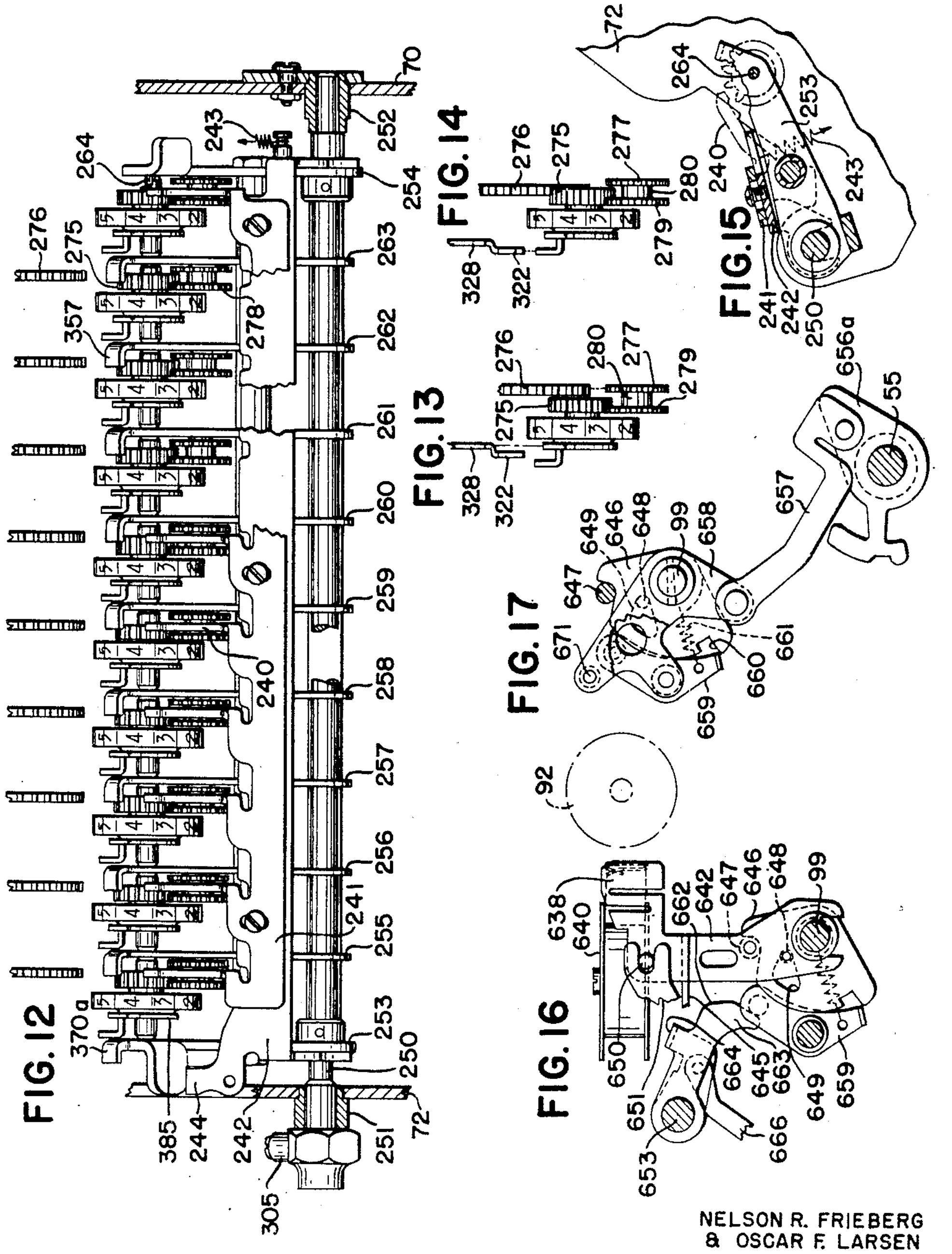
Fig. 12 is a plan view of the totalizer wheels and frame, and their relation to the differential racks.
Figs. 13 and 14 show, respectively, the subtracting and adding positions of the totalizer elements of a typical denominational order with respect to the associated differential racks and transfer levers.
Fig. 15 is a right end view of the mechanism by which the totalizer wheels are held immobile while out of mesh with the differential racks.
Figs. 16 and 17 show part of the ribbon-shifting mechanism as viewed from the right side.

Referring to Fig. 12, the totalizer is mounted in a frame including a shaft 250 journaled in bearings 251 and 252 mounted respectively in side frame plates 72 and 70, a left support arm 253, a right support arm 254, intermediate support arms 255, 256, 257, 258, 259, 260, 261, 262 and 263, and a shaft 264 extending between the rearwardly extending ends of support arms 253 and 254 and passing through support arms 255 to 263. The totalizer wheels are rotatably mounted in spaced relation on shaft 264. Each totalizer wheel (Fig. 21) has a ten-toothed pinion 265 to which is attached an indicator drum 266 bearing on its periphery ten digit numerals spaced according to the associated teeth of the pinion. On the left side of each indicator drum is a transfer pawl member having a subtract tooth 267 used in subtracting and negative total operations and an add tooth 268 spaced 36° therefrom with reference to the pinion circumference and spaced leftwardly from tooth 267 as viewed from the front of the machine, said add tooth being used in add and positive total operations.

Referring to Fig. 13, shaft 250 is shiftable leftwardly from the adding position shown, wherein toothed racks on the differentials, to be described, are in alinement with the associated pinions on the totalizer wheels, to a subtracting position in which the racks are in alinement with teeth on intermediate or idler pinions.

Taking the tens order totalizer wheel as a specific example, its pinion 275 (Figs. 12, 13 and 14) is in alinement with the tens order differential rack 276 in the adding position of the totalizer as shown in Figs. 12 and 14, whereas when the totalizer is shifted left to subtract position the rack 276 is in alinement with teeth 277 (Fig. 13) on idler pinion 278 which has another set of teeth 279, spaced therefrom by collar 280, which are in constant mesh with pinion 275.

Figures 23, 24, 26:
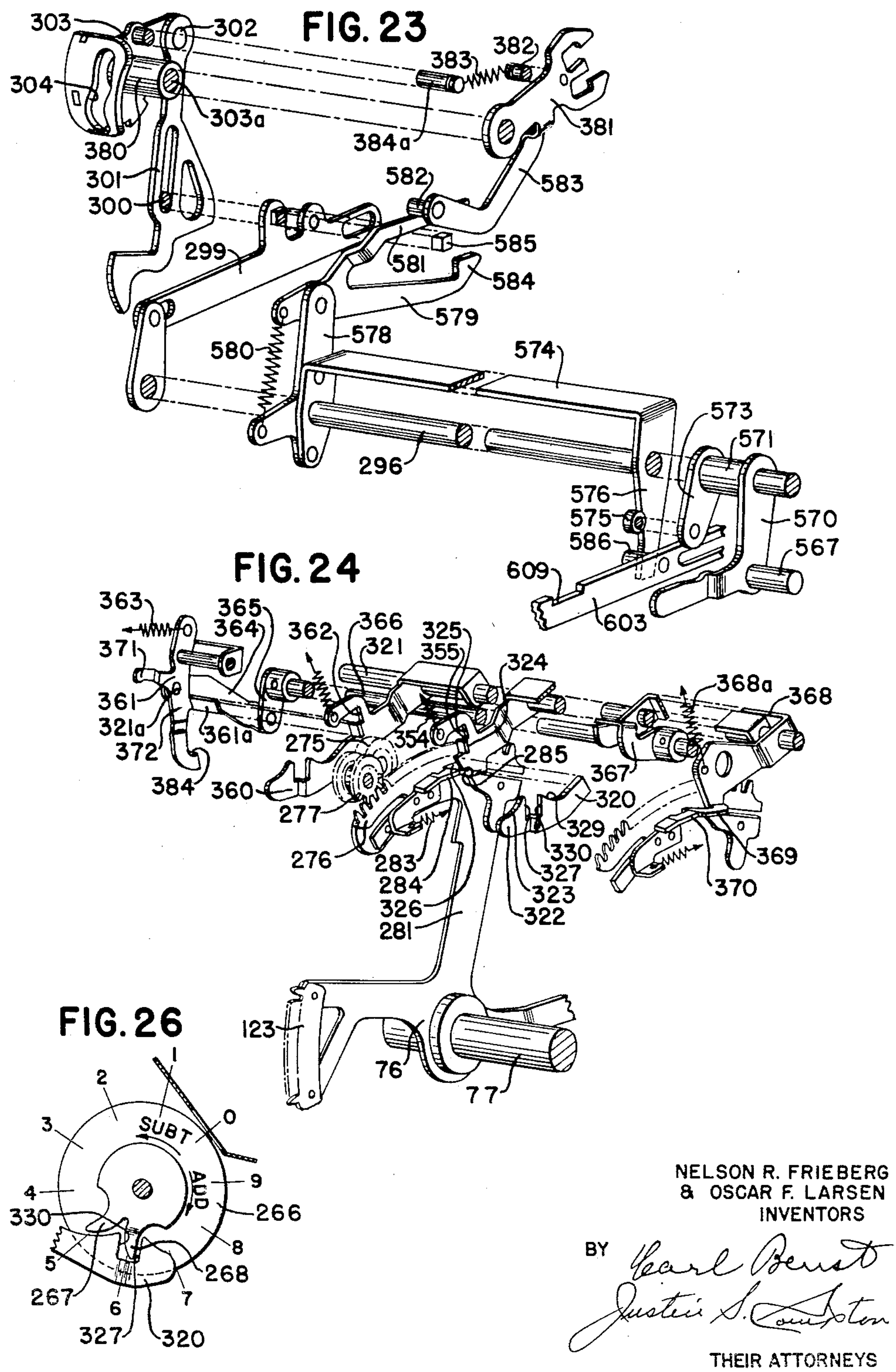
Fig. 23 shows a partly exploded view of the mechanism by which the selective shifting of the totalizer is effected in total-taking operations under control of the negative or positive condition of the totalizer.
Fig. 24 is a broken and partly exploded view of a typical differential rack and the means for entering the "fugitive one" in the units order under control of the highest order transfer latch.
Fig. 26 is a diagrammatic showing of the relative position of the transfer pawl teeth, number drum, sight aperture, and transfer lever associated with the totalizer pinion of a typical denominational order.

A view of the three-armed diverging lever 76 for a typical denominational order, and which will be discussed in connection with the tens order totalizer wheel, is shown in Fig. 24. The upwardly extending arm 281 has mounted thereon the toothed rack 276, the mounting being of the stud and slot type which permits of relative movement of the rack forwardly, from the normal position shown in which it is held by spring 283. Abutment 284 extends laterally from rack 276 and normally strikes an ear 285 of a transfer lever rocked by the totalizer wheel of next lower order as it passes through zero, which in the example under consideration is the units order, when such wheel approaches zero either in an adding or a subtracting direction. With the transfer lever in normal position, or return of three-armed lever 76 to home position in the last half of a machine cycle, the rack 276 is stopped by the ear 285 one tooth step before lever 76 reaches home position. The movement of the rack toward home position with lever 76, with the transfer lever of next lower order blocking the rack, is proportional to the digit to be entered in accordance with the value of the depressed key. If the transfer lever is moved and latched in moved position, as will be described, the rack gets an extra step of movement which represents the transfer of one unit from the next lower order.

In home position of the machine the totalizer pinions are in engagement with their respective racks and either the totalizer wheel pinions directly or through the idler pinions, depending on the lateral position of the totalizer frame unit as determined by the positioning of shaft 250 (Fig. 12). When the shaft is in the right position the racks are engaged with the totalizer wheel pinions and the collars between the sets of teeth on the idler pinions act as clearance slots for the excursions of the racks. In the left position of shaft 250 the racks are engaged with the idler pinions.

As shown in Fig. 12, the idler pinions are mounted on studs on the support arms, idler pinion 278 of the tens bank, mounted on support arm 263, being typical.

The engagement and disengagement of the totalizer pinions with the racks is accomplished by rocking the frame consisting of support arms 253 to 263 and shaft 264 about shaft 250.

Figure 27:
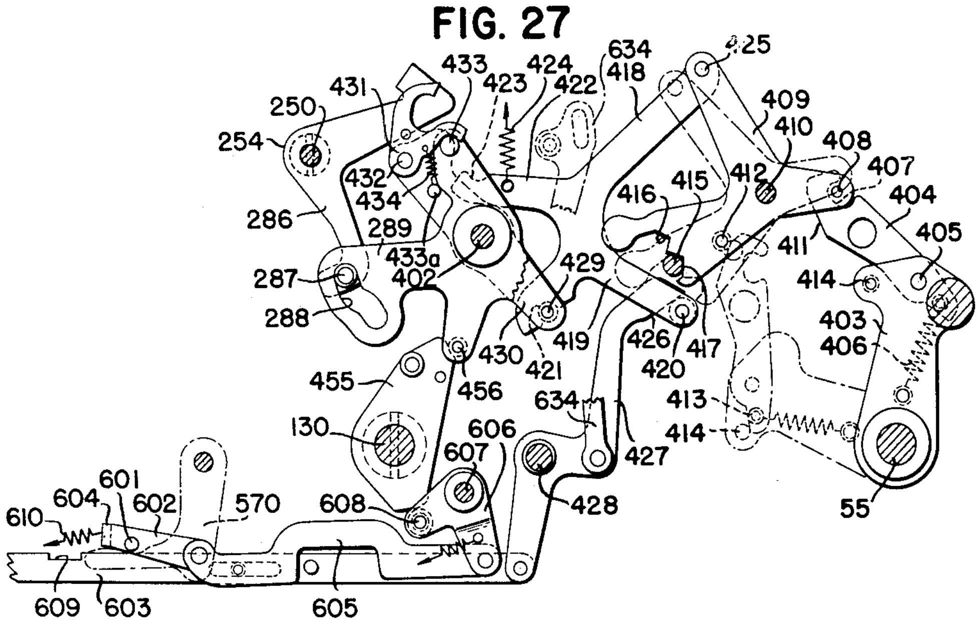
Fig. 27 is a view of part of the totalizer engaging mechanism and the associated total-taking controls therefor, as seen from the right.

Right side support arm 254 (Figs. 12 and 27) has a downwardly extending arm 286 (Fig. 27) having a roller stud 287 engaged in a cam slot 288 in a lever 289. Fig. 27 shows the position of the parts in home position with the totalizer pinions in engagement with the differential racks. If the totalizer engaging lever is rocked clockwise until stud 287 is in the other end of the slot 288, the arm 254 will be rocked counter-clockwise carrying the totalizer wheel pinions out of engagement with the differential racks. It is so arranged, as will be described in connection with the description of the totalizer engaging actuating mechanism, that the totalizer on item entering operations, either those of addition or subtraction, which require one machine cycle, is disengaged during the first part of the first half cycle and re-engaged near the end of the first half cycle. During disengagement the totalizer may be shifted laterally and the stop bars and differential racks set to the selected positions. Other things such as transfer reset and printing occur during the totalizer disengagement. The totalizer is reengaged with the racks before the second half of the machine cycle commences and during the second half cycle the selected digit values are entered into the totalizer.

To keep the totalizer pinions from moving while out of engagement with the racks, there is a pawl 240 (see Figs. 12 and 15) associated with each pinion. Pawls 240 are a part of plate 241 adjustably mounted on a bail 242 having bifurcated end portions embracing shaft 250 on which it is rockable and held by spring 243 (Fig. 15) rocked clockwise until extension 244 (Fig. 12) strikes side frame plate 72 as the totalizer moves toward engagement with the racks, lifting the pawls 240 from engagement with the totalizer pinions. As the totalizer pinions are disengaged from the racks the pawls 240 become engaged therewith to hold the set position.

*Selection of totalizer for addition or subtraction*

Assuming the totalizer is in add position and it is desired to condition the machine for subtracting, depression of the subtract key 25 (Figs. 1, 6 and 18) slidably mounted on studs 288*a* and 289*a* mounted on bracket 225 mounted on the right inside wall of the casing, against the restoring urge of a spring 290, brings the lower edge of arm 291 into engagement with stud 292 (Fig. 18) of plate 293, mounted on screw stud 232 (Fig. 3), rocking it clockwise, causing stud 294 resting in a fork of lever 295 to rock lever 295 counter-clockwise turning shaft 296, to which it is pinned, in the same direction. Shaft 296 extending across the machine and journaled in side frames 70 and 72 has secured to its left end a lever 297 (see also Fig. 5) having a stud 298 riding in a slot in the forward end of a link 299 equipped with a stud 300 riding in a slot in lever 301 the upper end of which is pivotally connected to stud 302 on totalizer shifting cam 303 which is mounted on side frame-held stud 303*a* and which has a curved slot 304 (see Fig. 23) in which rides roller stud 305 (Figs. 5, 12 and 18) secured to the end of totalizer shaft 250. Depression of the subtract key 25 rocks lever 301, as seen in Fig. 5, counter-clockwise. On the left end of rock shaft 130 (Fig. 5) is a plate 306 which rocks clockwise and then counter-clockwise during a machine cycle. With the machine having the parts in the position shown in Fig. 5 plate 306 accomplishes nothing during a machine cycle. If the subtract key is depressed lever 301 is rocked counter-clockwise and, when a machine cycle commences stud 307 engages surface 308 pulling lever 301 down, rocking cam 303 counter-clockwise shifting shaft 250 to the left to bring the totalizer into subtract position with the idler pinions in line with the differential racks. This shifting occurs just after the totalizer pinions are disengaged from the racks. To insure continued depression of the subtract key during the machine cycle, a hook 309 (Fig. 6) moves over a stud 310 on the stem of subtract key 25 as it is pressed down. Hook 309 is part of and extends upward from a link 311 mounted by stud and slot coupling to the bracket 225 on the inside of the casing, for forward and backward movement, and is moved into effective position by spring 312 when a tail hooking over stud 313 on lever 314 is released. Lever 314 (Fig. 3) is pivoted to the side frame 70 and is urged counter-clockwise against stud 315 on link 133. As link 133 moves forward on a machine cycle in response to the urge of spring 316, the hook 309 (Fig. 6) moves toward stud 310 striking it if the subtract key is not depressed, but locking it in depressed position if it had been and is being held depressed by the operator until the machine cycle starts. On the second half cycle of the machine the key is unlatched as stud 315 strikes lever 314.

If the next machine operation is a subtract operation lever 301 being rocked by link 299 (Fig. 5) remains in its down position. If the next machine operation is an addition operation stud 316*a* will strike surface 317 of lever 301 kicking it up to add position, as link 299 will not have been pulled forward, under which latter circumstance stud 316*a* would have moved along the rear edge of lever 301.

*Transfer mechanism*

Figures 19, 20, 21, 22:
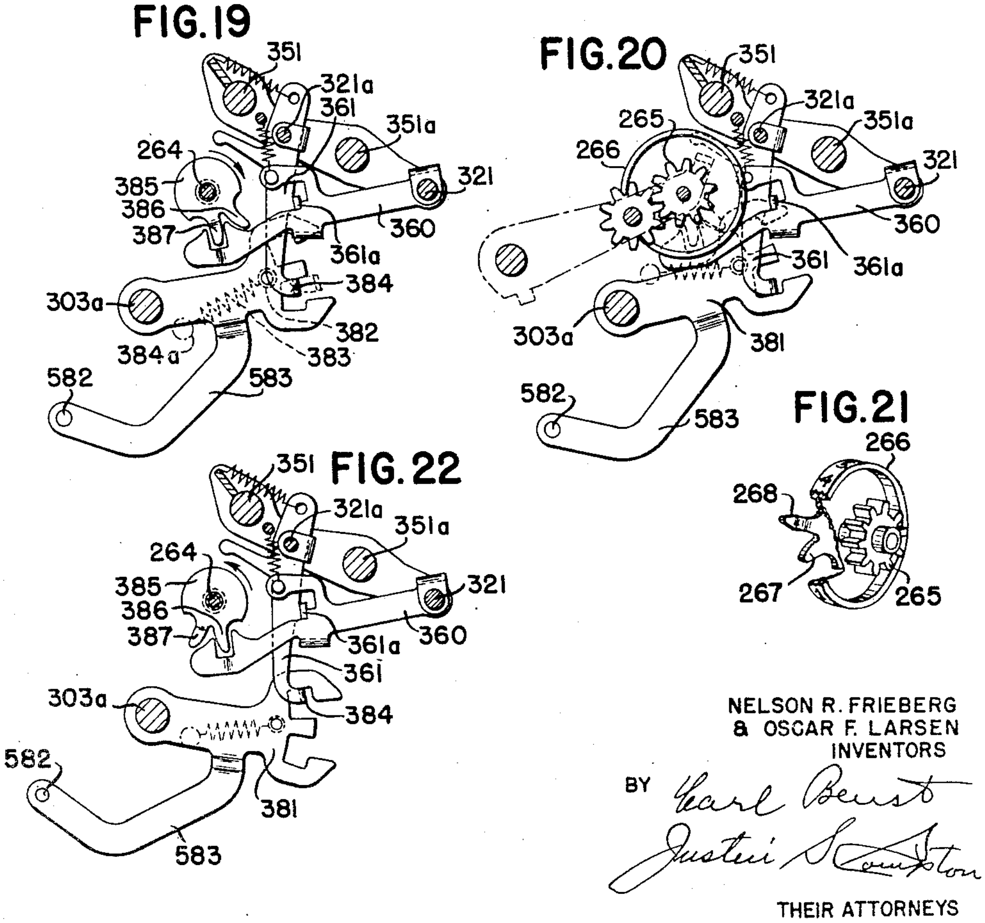
Fig. 19 is a detail of the "fugitive" one entry control mechanism after a subtract operation and just prior to the totalizer passing from a positive condition to a negative condition.
Fig. 20 shows the substance of Fig. 19 with an added showing of the indicator drum and the totalizer add and subtract pinions, and with the "fugitive" one control mechanism as it is after an addition has been made to a positive total.
Fig. 21 shows a typical totalizer wheel with pinion and transfer pawl teeth.
Fig. 22 shows the substance of Fig. 19 when a negative total has been taken from the totalizer.

Referring to Fig. 21, it will be remembered that on each totalizer wheel there is a transfer pawl tooth 268 that is associated with adding operations and positive total-taking operations. Similarly tooth 267 is associated with subtracting operations and negative total-taking operations.

Associated with each totalizer wheel adjacent its left side is a transfer lever, a typical lever 320, representing the units order, being shown in Fig. 24, rockably mounted on a shaft 321 supported by the machine framework.

This transfer lever has an outer offset portion 322 (see also Figs. 13 and 14) in line with the add tooth of the transfer pawl (see tooth 268, Fig. 21) of units order when the totalizer is in add position. On adding operations, as the add tooth of the totalizer pinion approaches zero position it rides on cam surface 323 (see also Fig. 2) rocking the transfer lever down where it is latched by ear 324 (see also Fig. 2), of a latch member, entering notch 325. Ear 326 is thereby taken out of alinement with the abutment on the differential rack of the tens order, allowing an additional movement of one unit to the totalizer wheel of next highest order in the manner heretofore described. On total-taking operations, where a positive total is involved vertical stop surface 327 of the offset portion of transfer lever 320 engaging the add tooth stops the associated totalizer wheel when it reaches zero position in its total-taking reverse rotary movement. Similarly, when the totalizer is shifted to the left for subtraction or the taking of negative totals, portion 323 (Figs. 13 and 14) of transfer lever 320 is in alinement with the subtract transfer pawl tooth (see tooth 267, Fig. 21) on the units totalizer pinion and in subtract entry operations it cams down on transfer lever surface 329 (Fig. 24) to cause an entry of a negative unit in the tens totalizer pinion. On negative total-taking operations the subtract tooth of the units order transfer pawl stops the units totalizer pinion at zero position by striking surface 330.

The highest order transfer lever is used to enter a "fugitive one" into the lowest denominational order whenever entries cause the totalizer as a whole to pass through zero either from negative or positive or vice versa, as will be described later.

A typical transfer lever latch will be described with reference to Figs. 2 and 24. To the side of each totalizer wheel is a plate 350, supported on rods 351 and 351*a* secured in the side frame plates, on which is pivotally mounted a latch piece 352 urged counter-clockwise by a spring 353 and having an ear 324 (see Fig. 24) playing in notch 325 of the associated transfer lever. The transfer lever is urged upwardly by spring 354. The normal position of the transfer lever is shown in Fig. 24. When knocked down, or tripped, by the transfer pawl of the associated totalizer wheel, ear 324 snaps over surface 355 locking the lever in tripped position. Such tripping occurs only when the totalizer is in engagement with the differential racks. Each latch has a forwardly projecting tail 356 (Fig. 2) which is given an upward thrust when the totalizer is brought out of engagement with the racks by bent-over ears on the rear ends of the totalizer support arms, the ear 357 for the tens order shown in Fig. 12 being typical. Such resetting of the transfer levers occurs at the beginning of each item entering machine operation and at the beginning of the first machine cycle of a two-cycle total-taking operation as the totalizer comes out of engagement with the racks.

*"Fugitive one" Mechanism*

When the totalizer contains a positive total, a total is taken with the totalizer in the add position and if it contains a negative total, the total is taken with the totalizer in he subtract position. A totalizer wheel, typified by the wheel of Fig. 21, when reset to zero from a position total will be reversely rotated until the positive transfer pawl tooth 268 strikes the surface 327 (Fig. 24) of the associated transfer lever. This will show a "0" on the indicator drum through the viewing aperture 21 (Figs. 1 and 27). When the wheel of Fig. 21 is reset to zero from a negative total it is rotated in the opposite direction until the negative transfer pawl tooth 267 strikes stop surface 330 of its associated transfer lever. This will show a "9" of the indicator drum through the viewing aperture 21. Thus, after a total is taken from the totalizer under control of the positive transfer pawl teeth, that is when the totalizer is in add position, the indicator drums will show "0000000000" through the viewing aperture, whereas when a total is taken under control of the negative transfer pawl teeth, that is when the totalizer is in subtract position, the indicator drums will show "9999999999." As the drums show the actual position of the totalizer wheels, such zero positions will be referred to as "positive" zero and "negative" zero. In returning the totalizer wheels to "positive" zero or to "negative" zero the differential racks must be moved a distance equal to the true total, be it positive or negative, and such is provided for by a mechanism which insures the entry of a "fugitive one" into the totalizer as it passes from "0000000000" to "9999999999"

or from

"9999999999" to "0000000000"

during an item entry operation.

The following examples show the exhibited numerals of the indicator drums and hence the position of the totalizer wheels during a series of entry operations starting with the totalizer at zero.

| | |
|---|---:|
| add | 0000000000 |
| | +1 |
| | 0000000001 |
| subtract | −2 |
| | 9999999999 |
| (fugitive one correction) | −1 |
| | 9999999998 |
| add | +5 |
| | 0000000003 |
| (fugitive one correction) | +1 |
| | 0000000004 |

It will be seen that the "fugitive one" is added during an adding operation and subtracted during a subtracting operation.

Similar operations occur between banks during entry operation to transfer carry-over data, for instance

| | |
|---|---:|
| add | 0000000009 |
| | +1 |
| | 0000000010 |

involves an entry of "one" into the tens bank in a positive sense whereas

| | |
|---|---:|
| subtract | 0000000010 |
| | −1 |
| | 0000000009 |

involves an entry of "one" into the tens bank in a negative sense.

Whereas the positioning of the totalizer in item entering is determined by the operator of the machine according to whether he depresses the "add" key 24 or the "subtract" key 25, the positioning of the totalizer in total-taking is controlled automatically according to whether the amount in the totalizer is positive or negative. If the amount of the total is positive the total will be taken by cooperation of the totalizer pinions directly with the differential racks and if the amount in the totalizer is negative the said racks will engage the totalizer pinions indirectly through the intermediate or idler pinions, such selection to be described in connection with total-taking operations.

Whenever the highest order totalizer wheel approaches the zero point from the positive side going toward the negative side or from the negative side going toward the positive side, a unit is entered into the lowest order totalizer wheel to correct for the "fugitive one."

Referring to Fig. 24, the transfer lever 360 for the highest order totalizer wheel is tripped as that wheel approaches zero from either direction and lever 361, rockably mounted on shaft 321a, which normally has latch ear 361a in the lower part of notch 362, is permitted to move so latch ear 361a moves into the upper part of notch 362 in response to the urge of spring 363, moving link 364 rearwardly to rock crank 365, pinned to shaft 366, turning shaft 366 counter-clockwise as looked at from the right side of the machine. A lever member 367, pinned to shaft 366, normally holds a yoke 368, rockably mounted on shaft 321, so that ear 369 thereof is in alinement with abutment 370 on the units order differential rack. On lever member 367 being rocked ear 369 is lowered rocking yoke 368 against the restoring action of spring 368a allowing the entry of the "fugitive one" to be made into the units order, either additively or subtractively depending on the lateral position of the totalizer. On the next machine operation yoke 368 is reset to the effective position shown in Fig. 24 by ear 370a (Fig. 12) acting on tail 371 (Fig. 24) of lever 361, in a manner similar to the resetting of the transfer latches.

Means has been provided to keep the lever 361 (Fig. 24) from rocking except when the highest order wheel in passing through zero does it by an entry opposite in algebraic sign to the last previous entry, such means preventing the entry of a "fugitive one" when the totalizer exceeds its capacity positively or negatively.

Rockably mounted on the portion of the before mentioned stud 303a (Fig. 23), which passes through collar 380 secured to the left side frame plate and through the left side frame plate, is an E-shaped flipper member 381 having a leftwardly protruding stud 382 acting as an anchor for one end of a spring 383 the other end of which is attached to a stud 384a secured to totalizer shifting cam 303. When shifting cam 303 is turned counter-clockwise, as viewed in Fig. 5, to subtract position, the rear end of E-shaped member 381 in trying to follow stud 384a is urged downwardly by the spring 383. When cam 303 is returned to the add position, shown in Fig. 5, the E-shaped member 381 is urged upwardly toward the position shown in Fig. 5.

After a series of adding operations from positive zero, cam 303 is in the position shown in Fig. 5 and the E-shaped member is in its upper position wherein the lower arm of the E embraces ear 384 on the downwardly extending tail 372 of lever 361, preventing movement of lever 361 even though the transfer lever 360 is rocked down by the transfer pawl of the highest order totalizer wheel on a subsequent add operation. After a series of subtract operations during which the amount in the totalizer passes from positive to negative the ear 384 will be embraced by the upper arm of the E which prevents lever 361 from movement on a subsequent subtract operation in which the transfer lever 360 is rocked down.

Figure 18:
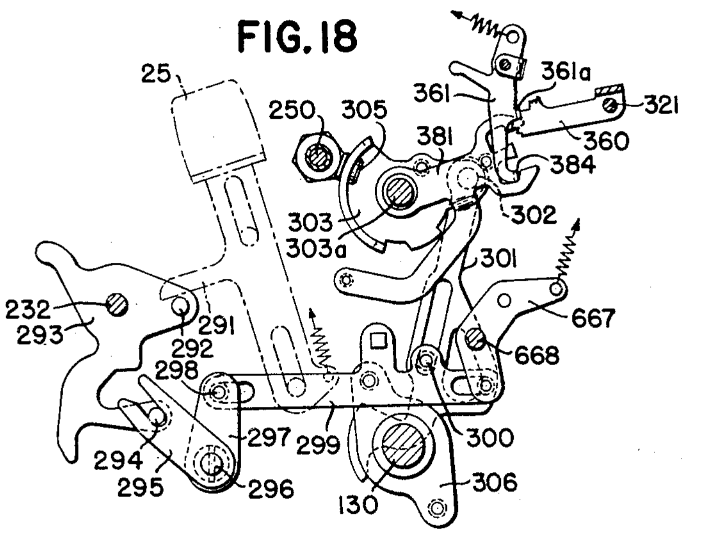
Fig. 18 shows the train of mechanism for causing a subtract operation.

Fig. 18 also shows the disposition of lever 361 and E-shaped member after a series of adding operations. It is apparent that if the transfer pawl tooth trips the highest order transfer lever, latch lever 361 is unable to move to enter the "fugitive one" into the lowest order, the ear being caught by the upwardly extending lip of the lower embracing arm of the E. This state of affairs continues as long as items are continuously added. Now, if the next item is a subtract item cam 303 will be rocked to urge E-shaped lever 381 downwardly which movement it cannot complete, as the underside of the center tongue of the E strikes the ear 384. If, then, lever 361 is permitted to rock counter-clockwise, as seen in Fig. 18, because the subtract transfer tooth of the highest order totalizer wheel has rocked the highest order transfer lever down, the "fugitive one" will be entered. This condition is shown as about to happen in Fig. 19 where the totalizer wheel of the highest order turning subtractively carries with it transfer pawl 385 in the direction of the arrow. One more unit of movement will cause subtract tooth 386 to rock lever 360 down, allowing lever 361 to rock so ear 384 escapes from under the tongue of the E, as shown in dotted line, whereupon the E-shaped member drops down until the upper lip of the E strikes ear 384. At the commencement of the next cycle of operation the lever 361 is restored to latching position which traps ear 384 within the embrace of the upper arm of the E as long as subtract operations are continued. If, then, an addition operation is commenced, cam 303 is shifted causing E-shaped member 381 to be urged upwardly and ear 384 will strike the upper edge of the tongue thereof but will not by-pass it until the add transfer pawl tooth (Fig. 22) knocks down the transfer lever as the highest totalizer wheel passes through zero going in a positive direction. When that hapens lever 361 is rocked counter-clockwise entering the "fugitive one" into the units order totalizer wheel and when the next machine operation is commenced the ear 384 will be trapped by the lower embracing arm of the E.

The position of the E-shaped lever 381 (Fig. 22) indicates whether the accumulated total is negative or positive and that position controls the selection of the totalizer to take a negative or positive total and such mechanism, shown in Fig. 23, will be explained in connection with total and sub-total taking operations.

*Totalizer engaging mechanism for add and subtract operations*

As previously described in connection with Fig. 27, totalizer engaging lever arm 286 is rocked counter-clockwise, to disengage the totalizer, through the action of cam slot 288 on roller stud 287. Totalizer engaging cam lever 289 is rockably mounted on a stud 402 secured to the inside of the right frame plate 70 and is movable within the limits imposed by cam slot 288. Pinned to shaft 55 and moving with plate 131 (Fig. 3) to which it is pinned by pivot stud 132 (see also Fig. 4) is a drive arm 403 rocked each machine cycle first counter-clockwise to the dotted line position it has at the end of the first half of the cycle, as shown in Fig. 27, and then clockwise to home position shown in full line. On the upper end of arm 403 is a lever 404 pivoted on stud 405 and normally urged to a line radial with the center of shaft 55 by a spring 406 and having a hook portion 407 which embraces a stud 408 in the rearwardly extending arm of a three-armed lever 409 pivoted on stud 410 extending inwardly from the right side frame plate 70. As a machine cycle commences, lever 404 immediately rocks lever 409 counter-clockwise and in doing so straightens out to the radial position dictated by spring 406 until cam edge 411 thereon strikes stud 412 causing lever 404 to rock clockwise on stud 405 until a tail surface 413 thereon strikes stud 414 on arm 403 whereupon pressure is exerted on stud 412 rocking lever 409 to home position just at the end of the first half cycle of a machine operation. On the second half of the machine cycle arm 403 moves to home position, and lever 404 rehooks on stud 408. A spring-urged stud 415 is provided to engage either in notch 416 or 417 to hold lever 409 in either home position or moved position. Stud 415 is secured to a lever, not shown, pivoted to the right side frame and urged by a spring in the effective direction. Pivoted at 425 to an upwardly extending arm of lever 409 is a lever 418 having three arms, a rearwardly and downwardly extending arm 419 having a stud 420, a downwardly and forwardly extending arm having a notch 421 and a forwardly extending arm 422 having a notch 423. Lever 418 is constantly urged clockwise around pivot 425 by a spring 424. Lever 418 normally is kept with stud 420 in contact with surface 426 of a lever 427 pivoted on stud 428 which remains in the position shown except intotal-taking and sub-total-taking operations when it is rocked counter-clockwise by the total or sub-total keys. Notch 421 is thereby kept engaged with a stud 429 on a lever 430 rockably mounted on stud 402. Lever 430 has, on its upper end a hook member 431 pivoted on stud 432 and normally engaging a stud 433 on lever 289 because of the urge of spring 434. Stud 433a on lever 430 is in contact with the forward edge of the upwardly extending arm of lever 289. Under such circumstances, as lever 409 is rocked counter-clockwise at the beginning of the machine cycle and clockwise to home position at the end of the first half of the machine cycle, lever 430 and lever 289 hooked thereto by hook member 431 rocks first clockwise to disengage the totalizer and then counter-clockwise to engage the totalizer at the end of the first half of the machine cycle. This is the totalizer engaging timing for add and subtract operations.

*Non-add operation*

Figure 31:
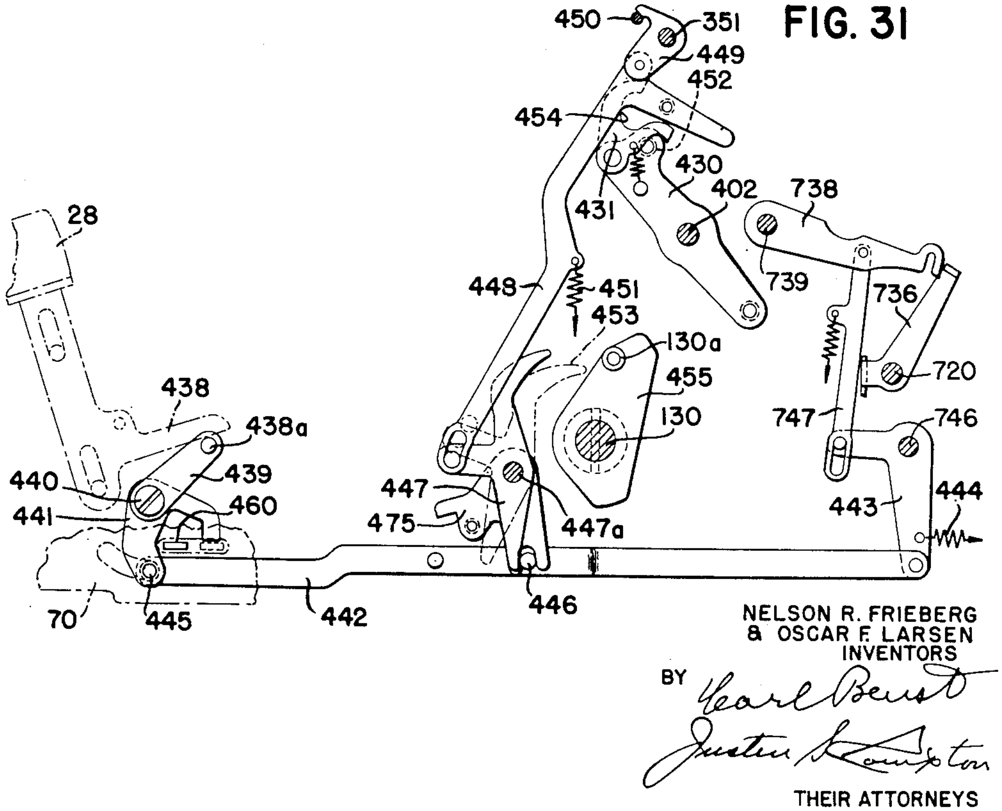
Fig. 31 is a view of the non-add operation control mechanism.

In a non-add operation key 28 (Fig. 31) mounted on studs 435 and 436 (Fig. 6) secured on bracket 225 mounted on the right inside of the casing is depressed against the action of spring 437 and arm 438 thereof, pressing down on stud 438a (Fig. 31) on lever 439 secured to a shaft by screw 440, said shaft also having secured thereto a bell crank lever 441 pivoted by stud 445 to the forward end of a link 442 the rear end of which is pivoted to a bell crank lever 443 urged counter-clockwise by a spring 444 until stud 445 on bell crank lever 441 hits the rear end of a slot in side frame plate 70 in which it rides. As key 28 is depressed it rocks bell crank lever 441 clockwise drawing link 442 forward causing stud 446 to rock lever 447, mounted on stud 447a in the right side frame plate 70, to the dotted line position shown where it is held temporarily by latch piece 475, as will be explained. Lever 447 has a stud and slot connection with link 448 pivoted at the top end to a bell crank lever 449 pivoted on shaft 351. Bell crank 449 is urged counter-clockwise against a stop stud 450 by spring 451. In all but non-add operations stud 452, on a rearwardly extending arm of link 448, has no effect on hook member 431 of totalizer engaging actuating lever 430. On non-add operations, as shaft 130 rocks counter-clockwise on the first half cycle roller stud 130a will ride over the surface 453 of lever 447 causing it to be rocked farther clockwise, forcing link 448 to rise. At this time stud 452 embraced by notch 454 of hook member 431 rocks hook member 431 counter-clockwise disengaging actuating lever 430 from totalizer engaging camming lever 289 (see Fig. 27). Thus, although lever 289 is rocked clockwise at the beginning of a non-add machine operation, through the action of stud 433a, hook member 431 is rendered ineffective during the middle of the first half of the machine cycle, leaving the totalizer disengaged until the end of the machine cycle when plate 455, on its way to the home position after being rocked first counter-clockwise and then clockwise by shaft 130 to which it is pinned, returns lever 289 to home position by striking stud 456 on an arm thereof. The non-add key is held against operation when the total key or sub-total key has been depressed because of the movement of lever 480 to the dotted line position as will be explained in connection with total taking, preventing bell crank lever 441 from being rocked.

Figure 40:
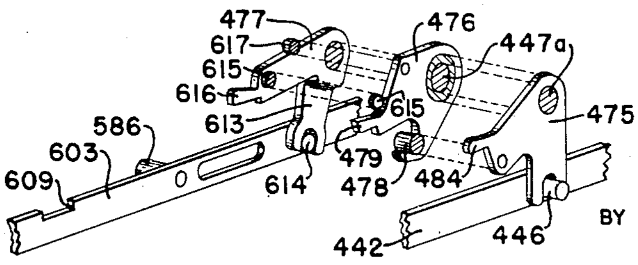
Fig. 40 is an exploded view of the latch mechanism for controlling the tripping of the machine on non-add operations and for controlling the two machine cycles of total and sub-total operations.
Figure 4:
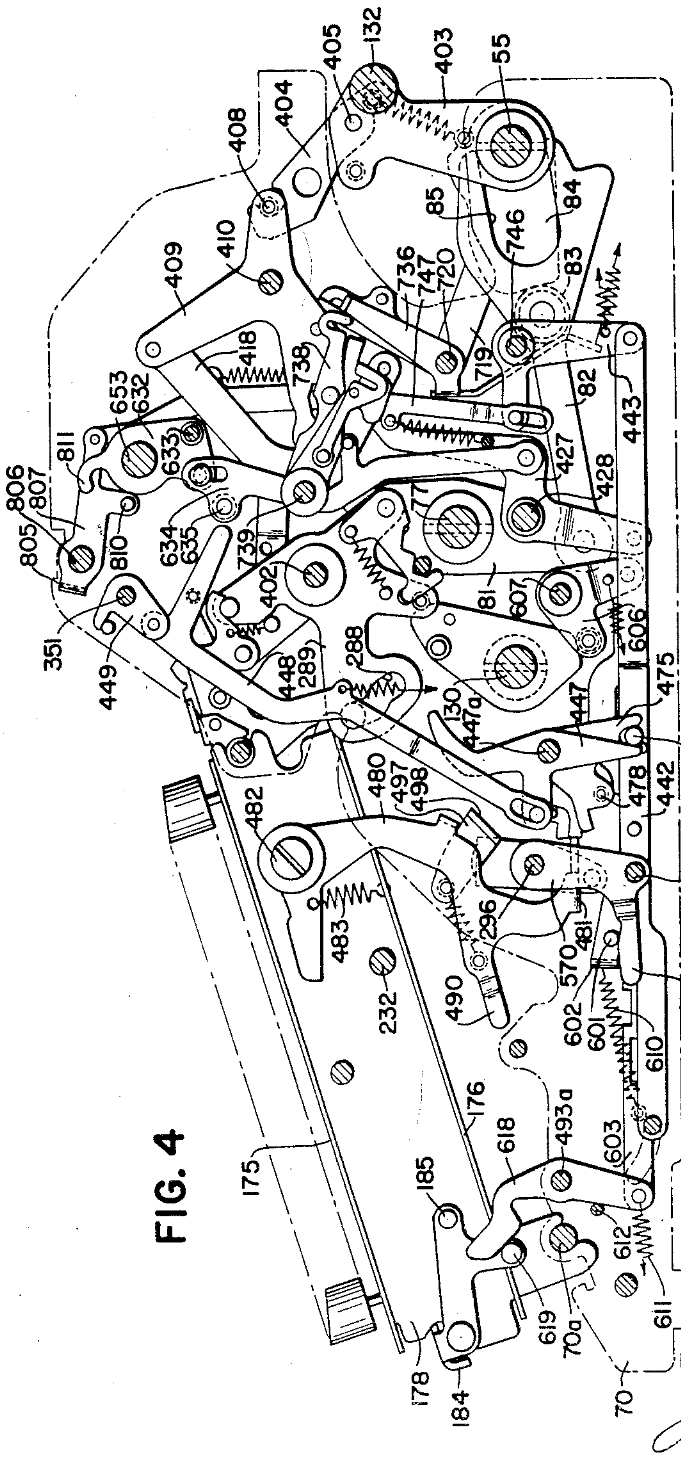
Fig. 4 shows more of the right side control mechanism, most of which is on the inside of the right side frame.
Figure 30:
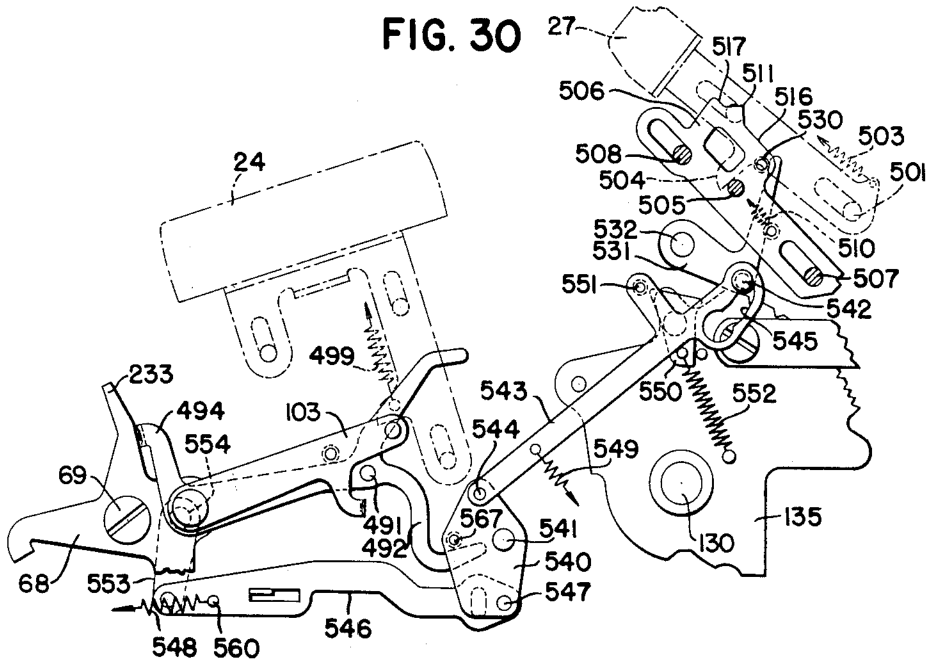
Fig. 30 is a view of the add and total control keys with relation to the machine release mechanism.

Depression of the non-add key and the consequent forward shift of link 442 also starts the machine operation. Referring to Figs. 4 and 40, there is pivotally mounted on stud 447a three latch pieces 475, 476 and 477. Latch piece 477 is used only in total operations and sub-total operations. Latch piece 476 has a forwardly projecting tongue 479 normally blocking the counter-clockwise movement of lever 480 (Fig. 4), pivoted on screw stud 482 and urged by spring 483 so foot 481 makes contact with said tongue. Latch piece 475 (Fig. 40) has a forked arm embracing stud 446 on link 442 and a forwardly projecting portion comprising a tongue 484 and a sidewardly projecting pin 478 extending into the bottom of a notch in latch piece 476. As link 442 moves forward on operation of the "non-add" key, latch piece 475 rocks clockwise and pin 478 rides up in the notch of latch piece 476 bringing tongue 484 in front of foot 481 of lever 480 and rocking latch tongue 479 upwardly out of the path of foot 481. Continued movement of link 442 displaces tongue 484 upwardly until foot 481 moves under tongue 484 allowing lever 480 to rock counter-clockwise and preventing rearward movement of link 442, until the end of the machine cycle, if and when the operator removes his finger from the "non-add" key and it is restored to its normal position. The rocking of lever 480 counter-clockwise causes a forwardly extending arm 490 thereof to strike a stud 491 (see also Fig. 3) extending inwardly from the diverging point of a two-armed trip lever 492 rockably mounted on stud 493 secured in lever 68. Trip lever 492 ordinarily is held up by a spring 499 (see also Fig. 30). Trip lever 492 has a tail 494 with a bent-over ear which bears against upwardly extending arm 233 of lever 68 and is held there by the spring 108 extending between tail 494 and an ear 496 on a forward arm of lever 68. The consequent rocking of lever 68 releases the machine which then commences a cycle of operation.

Lever 480 (Fig. 4) has a by-pass pawl 497 which is by-passed by stud 189 (Fig. 3) on plate 185 during the first half cycle of a machine operation. During the last half of the machine cycle stud 189 rides upwardly against surface 498 of by-pass pawl 497 rocking lever 480 clockwise to home position. Latch piece 475 (Fig. 40) may drop allowing tongue 479 of latch piece 476 to hold lever 480 in home position.

*Total taking*

A total-taking operation, taking two machine cycles, is commenced by depressing "total" key 27 (Figs. 1, 6 and 30) slidably mounted on studs 500 and 501, secured in bracket 225 fastened on the right inside of the machine casing, and normally urged upwardly by a spring 503. A finger 504 of said key strikes a stud 505 (Fig. 30) on the total key slide plate 506 slidably mounted on studs 507 and 508 secured in the right side frame plate 70 and normally held in the up position by spring 510. A locking formation 511 on slide plate 506 cooperates with a stud 512 (Fig. 3) on lever 513 pivotally mounted on screw stud 514 secured in the right side frame plate 70 and urged counter-clockwise by spring 515. When the total key is in unoperated position stud 512 rests on surface 516 (Fig. 30) and when the total key is depressed stud 512 rides over formation 511 and comes to rest on surface 517. A formation 518 (Fig. 3) on the sub-total slide plate 519 mounted to the outside of total slide plate 506 and also cooperating with stud 512 in the manner described in connection with total slide plate is provided to control the sub-total slide plate also, as on sub-total operations, to be described, both the total slide plate 506 and the sub-total slide plate 519 are moved downwardly together by the sub-total key. By preventing the rocking of lever 513 from the position shown in Fig. 3, either the total slide plate or the sub-total slide plate or both may be held locked in operated or unoperated position.

Each time the machine is tripped lever 62$a$ (Figs. 3 and 7) is rocked counter-clockwise as seen in Fig. 7. A hole 522 is provided in its right end to receive the tail of lever 520 (Fig. 3) rockably mounted on screw stud 521. Lever 520 has a surface 522$a$ which is brought under a stud 523 on by-pass lever 524 pivoted by stud 525 to an upwardly bent portion of the rear end of lever 513. The rocking of lever 62$a$ rocks lever 520 counter-clockwise to bring surface 522$a$ under stud 523 preventing the rocking of lever 513. Thus the total and sub-total slide plates are prevented from movement during a machine cycle of an item entering operation until lever 62$a$ is restored, or during the two cycles of a total or sub-total operation until lever 62$a$ is restored. This means that on item entering operations the total and sub-total keys can not be depressed and that if one or the other has been depressed for total or sub-total operations then such are not released until level 62$a$ has been restored. The by-pass mounting of lever 524 is a safety device arranged so that if lever 520 is moved toward stud 523 as stud 512 is riding over formations 511 or 518 lever 524 will give, by rocking clockwise around stud 525 against the urge of spring 529 which normally holds forwardly extending bent-over arm of lever 524 against the upper surface of lever 513. Such is a safety device to prevent possible breakage of the parts.

As the total key is depressed a stud 530 (Fig. 30) strikes the arm of a bell crank lever 531 pivoted on stud 532 rocking it clockwise. Total plate 540 rockably mounted on stud 541 secured in right side frame plate 70 is held in position shown in Fig. 30 by connection to stud 542 on bell crank lever 531 through a disconnectible link 543, pivoted to plate 540 by stud 544, which at its upper end has a notched slot 545 in which stud 542 rides. Stud 542 normally rides in the notch at the upper end of the slot so that on the clockwise rocking of bell crank lever 531 link 543 is forced downwardly and forwardly, rocking total plate 540 counterclockwise pulling a link 546 pivoted thereto by stud 547 to the rear against the urge of spring 548. A spring 549 normally keeps stud 542 engaged in the notch in the top of slot 545 but a by-pass pawl 550 on plate 135 passing stud 551 on link 543 as plate 135 rocks counter-clockwise on the first half of the first machine cycle is effective under the urge of spring 552 on the second half of the first machine cycle and strikes stud 551 uncoupling stud 542 from its notch and permitting link and plate 540 to restore to normal, when otherwise permitted, as will be explained. Stud 542 re-engages the notch in slot 545 at the end of the second cycle as slide 506 and bell crank lever 531 are restored. The forward end of link 546 is pivoted to a support link 553 which in turn is pivoted to a stud 554 in the right side frame plate 70. As plate 540 is rocked counter-clockwise and link 546 is drawn to the rear, several things are made to occur. First, spring anchor stud 560 (see Figs. 3 and 9), normally in the position shown in Fig. 3, when drawn rearwardly with link 546, moves under the bent end 561 of lever 562 pinned to shaft 563 rocking it counter-clockwise. Also pinned to shaft 563, which is journaled in the side plates 70 and 72 and extends therebetween, are two rearwardly extending arms, the right one 564 being shown in Fig. 9, supporting a stop bail 142 which is brought, by the rocking of shaft 563, to effective position as shown in Fig. 9 in front of the forward edges of plates 141 of all the stop bars, to keep them from movement during the first machine cycle. The bail 142 is restored to normal ineffective position early in the first half of the second machine cycle as link 546 returns home, as will be explained, under urge of spring 548. Second, stud 567 (Fig. 30) strikes the lower arm of trip lever 492 starting a machine operation. Third, slot 568 embracing a stud 569 (see Figs. 4 and 9) in a bell crank lever 570 secured to collar 571 (see also Fig. 23) rotatable on shaft 296, rocks said bell crank lever counter-clockwise which, also, through lever 573 secured to collar 571 rocks bail 574, rockably mounted on shaft 296, counter-clockwise through the action of stud 575 mounted on lever 573 striking its downwardly extending arm 576. Secured to the left support arm of bail 574 is an upwardly extending arm 578 to which is pivoted a three-armed lever 579. A spring 580 anchored between a forwardly extending portion of arm 578 and a forwardly extending arm of lever 579 normally keeps arm 581 of lever 579 under and in contact with stud 582 on a forwardly extending arm 583 of E-shaped flipper member 381. The parts in Fig. 23 are shown as though the totalizer was in a positive condition, that is with the E-shaped flipper member rocked clockwise in the up position. In such circumstances the stud 582 has pushed down on arm 581, against the urge of spring 580, to a point where a hook 584 on the third arm of lever 579 is in a plane lower than that of square stud 585 extending to the right from subtract link 299 so that when bail 574 is rocked by depressing the total key the forward excursion of hook 584 will not catch stud 585. However, if the E-shaped member 381 is in the negative condition, where it is rocked downward, indicating a negative total in the totalizer, the forward excursion of hook 584 draws stud 585, and link 299 forward which, through stud 300 draws lever 301 forward (see also Fig. 5) conditioning the machine for taking the total through the idler pinions of the totalizer in which case the totalizer pinions will be reversely rotated to the 9999999999 condition. Bail 574 is restored near the end of the second machine cycle with bell crank lever 570 and link 546. Stud 586 lying in front of support arm 576 acts as a stop against clockwise movement of the bail from normal position. Fourth, as bell crank lever 570 rocks counter-clockwise its forwardly extending arm 600 lowers allowing stud 601 (Fig. 4) and latch member 602 to drop in response to the urge of spring 610 from the position shown in Fig. 4 to where a bent-over ear 604 is riding on top of total control link 603. Latch member 602 (Fig. 27) is pivoted to a link 605 pivoted at its rear end to bell crank lever 606 urged clockwise on its support pivot 607 secured in right side frame plate 70 so roller stud 608 will ride the edge of plate 455. As plate 455 rocks counter-clockwise at the beginning of the first machine cycle of a total operation, link 605 moves forward until ear 604 of latch member 602 drops into notch 609 of link 603. On the second half of the first machine cycle link 605 is moved rearwardly carrying with it total control link 603 against the action of spring 611 (see Fig. 4) normally urging it to a forward normal position determined by stud 612 held in right side frame plate 70. As link 603 moves rearwardly, latch plate 477 (Fig. 40) is rocked counter-clockwise by connection to link 603 through forked arm 613 of latch piece 477 straddling stud 614 on link 603. Latch piece 476 is normally held in effective position, where tongue 479 thereof blocks foot 481 of lever 480 (Fig. 4), by the resting of stud 617 (Fig. 40) on the upper edge of latch 477. Stud 615 extending from latch piece 477 on counter-clockwise movement of latch piece 477 strikes tongue 479 of latch piece 476 moving the tongue 479 down from in front of foot 481 of lever 480 at the same time the tongue 616 of latch piece 477 moves down past foot 481, whereupon lever 480 (Fig. 4) rocks counter-clockwise causing arm 490 to make contact with stud 491 (Fig. 3) of machine trip lever 492 holding it down against the return urge of spring 499 (Fig. 30) as plate 540 makes a slight movement clockwise toward home position, at the close of the first machine cycle. As the foot 481 of lever 480 moves over the upper surface of tongue 616 of latch piece 477 (Fig. 30), link 603 is latched in rearwardly moved position. This occurs after the restoring movement is given lever 480 by stud 189 (Fig. 3) in the first cycle. On the second machine cycle stud 189 restores lever 480 permitting the total control mechanism to restore to home position.

As link 603 (Fig. 27) is moved rearwardly, it rocks lever 427 counter-clockwise around stud 428 during the last half of the first machine cycle and holds it rocked so surface 426 is away from roller stud 420 as lever 404 rocks lever 409. Notch 421 of lever 418 urged upwardly by spring 424 is released from engagement with stud 429 of lever 289 which otherwise would be rocked clockwise to disengage the totalizer on the first part of the first half of the second machine cycle. The differential racks on their forward movement in the first half of the second machine cycle reversely rotate the totalizer pinions to zero, the transfer pawl teeth striking the associated stop surfaces 327 and 330 of the transfer levers, depending on whether the total is positive or negative. The totalizer wheels will be returned to 0000000000 if the total taken is positive or 9999999999 if the total is negative. On the last half of the second machine cycle notch 423 of lever 418 engages stud 452 of lever 430 (see Fig. 31) rocking lever 430 clockwise, carrying lever 289 (Fig. 27) with it to disengage the totalizer from the racks so the totalizer will remain zeroized.

During the first half of the second machine cycle, as plate 455 is rocking counter-clockwise, link 605 moves forward and link 603 remains stationary, being locked by latch piece 477 (Fig. 40) in rearward position. As latch ear 604 (Fig. 27) of latch 602 moves out into notch 609 the pull of spring 548 (Fig. 30) will return plate 540 and link 543 to normal position, as bell crank lever 570 can rock clockwise lifting latch 602 up. When lever 480 (Fig. 4) is rocked clockwise by stud 189 (Fig. 3) near the end of the second machine cycle link 603 no longer restrained by latch 602 or latch piece 477 (Fig. 40) moves to normal position and the total key is released permitting stud 542 (Fig. 30) to reengage in the notch in link 543.

As link 603 is moved rearwardly during the last half of the first machine cycle lever 618 (Fig. 4), pivoted to the forward end thereof, is rocked counter-clockwise so that through action on stud 619 the key release bail is operated to release any digit keys that may have been depressed. This also moves the zero stops to ineffective position. The key release bail is returned to ineffective position as link 603 returns to normal position at the close of the second machine cycle.

The time of totalizer engaging is the same whether a positive or negative total is being taken.

After total-taking operations, lever 301 (Fig. 5) always returns to add position. If the total was negative the totalizer wheels are standing at 9999999999 and a positive entry thereinto will bring into operation the "fugitive one" mechanism. For instance, if the digit five be added, the totalizer then will register 0000000005.

If a negative total has been taken and a negative amount entered lever 301 is drawn forward and no "fugitive one" is entered. If a positive total has been taken and a negative amount entered the "fugitive one" will be entered as the totalizer passes to the negative side.

On total taking the differential mechanism and, hence, the printing bars will be moved the true amount of the total, be it positive or negative, during the second machine cycle. The printing of a total occurs at the mid-point of the second cycle of operation. On the first cycle, as no movement of the differential occurs, there is no printing operation, the printing hammers not being released. At the end of the second cycle of machine operation lever 82*a* (Fig. 7) is rocked clockwise which also causes lever 520 (Fig. 3) to rock clockwise releasing the total key.

*Sub-total taking*

In sub-total taking operations key 26 (Figs. 1 and 6) slidably mounted on studs 620 and 621 extending from bracket 225 and normally held in the up position by spring 622, is depressed. Arm 623 thereof strikes stud 624 (Fig. 3) on sub-total slide plate 519 slidably mounted on studs 507 and 508, forcing it downwardly carrying the total slide plate 506 with it as stud 505 thereof extends into the upper end of a slot on sub-total slide plate 519. All of the machine parts operated by total slide plate 506 on total taking operations are operated on sub-total operations except insofar as the action of sub-total slide plate 519 changes the timing of totalizer engaging so the totalizer will remain in engagement with the differential racks throughout the second machine cycle setting the printer bars to print the amount in the totalizer at mid-cycle.

Figures 28, 29:
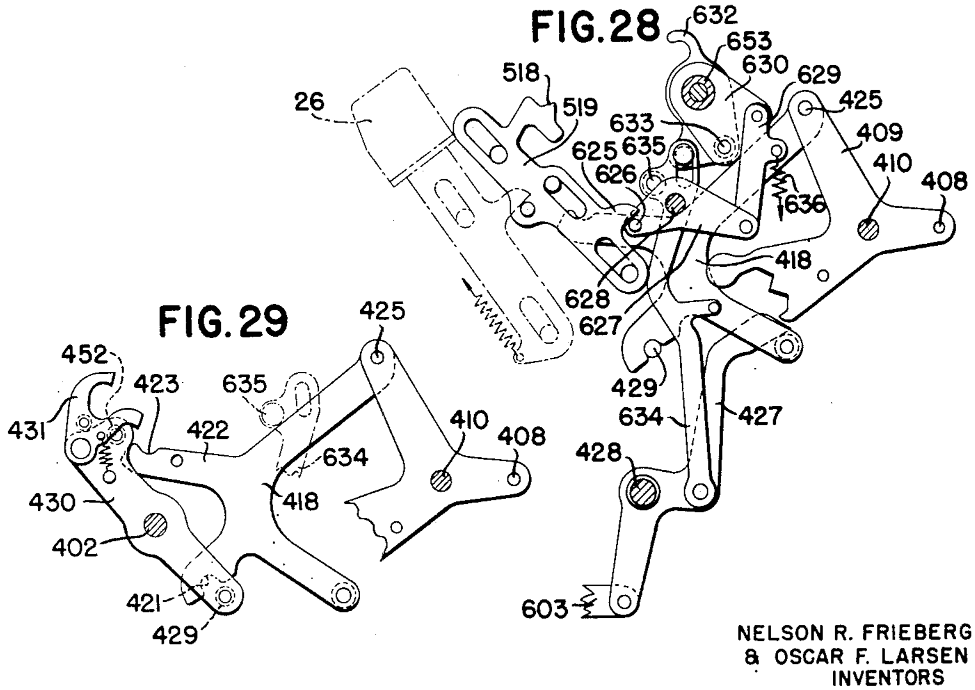
Fig. 28 shows the sub-total key mechanism and its relation to the substance of Fig. 27.
Fig. 29 shows part of the mechanism of Fig. 28 at the middle of the second cycle of a sub-total operation.

Referring to Fig. 28, as sub-total slide plate 519 is forced down by key 26 an arm 625 thereof strikes stud 626 on plate 627 rockable on stud 628, projecting from the right side frame plate 70, rocking plate 627 counter-clockwise. Pivoted to plate 627 is a link 629 in turn pivoted to plate 630 rotatable on shaft 653 extending between the side frame plates 70 and 72. This also rocks plate 630 counter-clockwise carrying with it plate 632 side spaced from plate 630 and rockably mounted on shaft 653, connection being made between plates 630 and 632 by pin 633 (see also Fig. 4). Pivoted to lever 427 (Fig. 28) is a link 634 coupled to plate 632 by a pin and slot connection. On total-taking operations lever 427 rocks counter-clockwise, as has been explained, raising link 634 in an idle movement permitted by the pin and slot connection to plate 632. The same thing occurs on sub-total taking operations except that the upper end of link 634 is moved to the rear by the rocking of plate 632. This positions roller stud 635 so lever 418 (see Fig. 29) cannot couple with lever 430 to disengage the totalizer during the last half of the second machine cycle, thus causing the data cleared from the totalizer on the first half of the second machine cycle to be returned thereto. Spring 636 returns the parts 627, 629, 630 and 632 to normal position on release of the sub-total key as lever 520 (Fig. 3) is rocked clockwise at the end of the second cycle through movement of lever 62*a* by the resetting of the machine release mechanism heretofore described.

*Ribbon shifting mechanism*

Means is provided to shift a bichrome printing ribbon 637 held in guides 638 and 639 (Fig. 41), located between the type bars 30 and platen 92 and wound on spools 640 and 641 from a normal position in which it prints added items and positive totals in black, to a raised position when printing subtracted items and negative totals in which the print will be in red.

Figure 41:
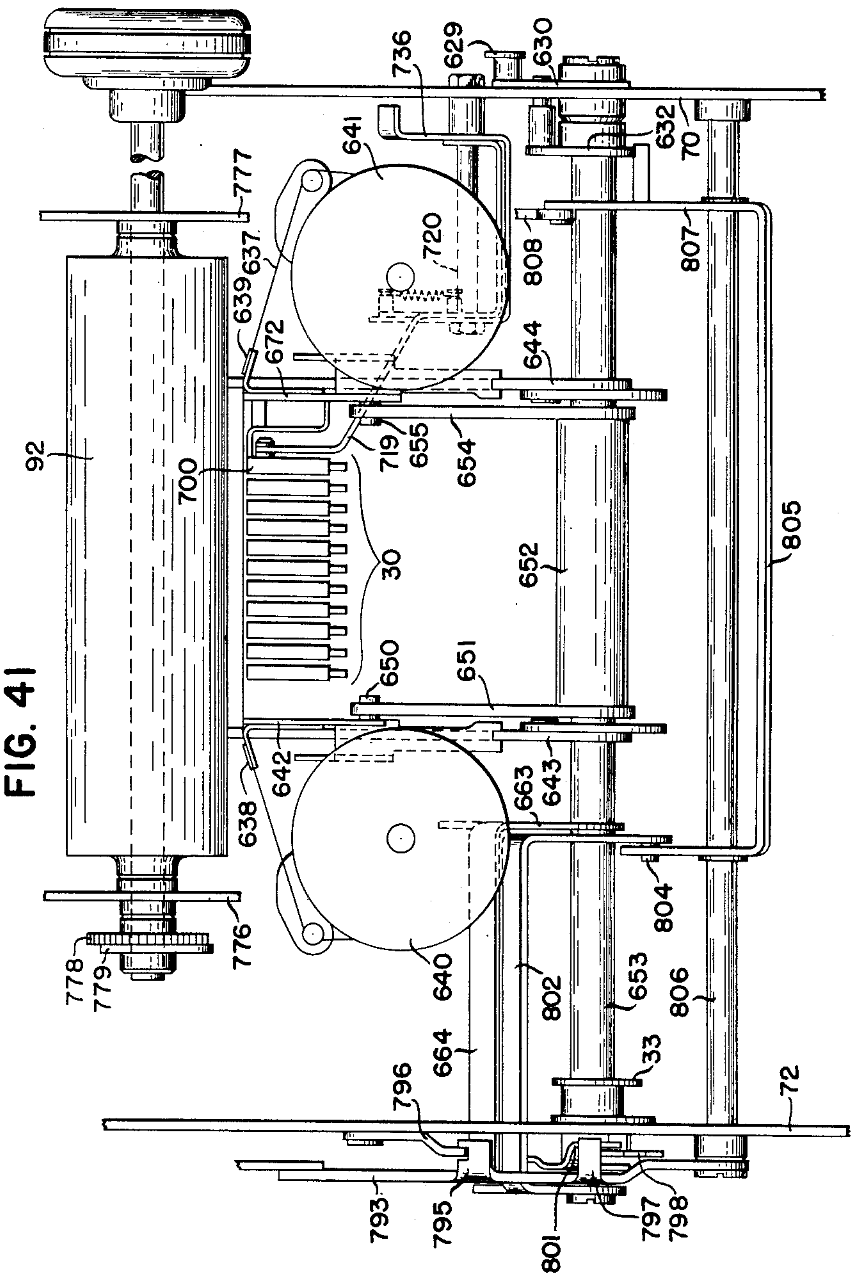
Fig. 41 is a top plan view of the printer and adjoining portions of the machine, with certain parts omitted.

Referring to Fig. 16 which shows the left ribbon spool 640, the left ribbon guide 638 and the left ribbon guide support plate 642, said guide support plate 642 is forked at the lower end and embraces shaft 99 extending between the printer frame plates 643 and 644 (Fig. 41). The upper end of ribbon guide support plate 642 is held against movement, except for vertical shifting, by a bent-over portion 645 which cooperates with printer frame plate 643 for such shifting. Rotatable on shaft 99 (Figs. 16 and 17) is a cam plate 646 on the periphery of which rides stud 647 extending from ribbon guide support plate 642. Also extending from ribbon guide support plate 642 is a stud 648 which rides in a slot 649 in cam plate 646. Rocking of cam plate 646 clockwise will cause a vertical movement upward of ribbon guide support plate 642. Extending from the top of ribbon guide support plate 642 is a stud 650 (see also Fig. 41) which rides in the forked end of an arm 651 extending rearwardly from a sleeve 652 rotatable on shaft 653 extending between side frame plates 70 and 72. On the right end of sleeve 652 is an arm 654 like arm 651 which embraces stud 655 on the right ribbon guide support plate 672 so that the vertical movement of left ribbon guide support plate 642 will be duplicated by the right ribbon guide support plate 672 mounted in the printer frame like ribbon guide support plate 642.

In the normal position of the parts, as shown, the ribbon guides are in the down position where the type will hit the upper half of the ribbon which is black. In the up position of the ribbon guides the type will hit the lower half of the ribbon which is red, causing a red print.

The shifting upward of the ribbon guides, caused by the rocking of cam plate 646 clockwise, occurs during subtract, negative total operations, and negative sub-total operations in the following manner. Shaft 55, (Fig. 17), heretofore described, is rocked counterclockwise during the first half of a machine cycle and clockwise during the second half of a machine cycle. Arm 656*a* thereon, through link 657, rocks plate 658, pinned on shaft 99, clockwise and then counter-clockwise during a machine operation. A latch 659 constantly is urged to latching position in notch 660 of cam plate 646 by spring 661 but is normally held from latching position by the cam edge 662 (see Fig. 16) on an arm 663 rockable on shaft 653 extending between the machine vertical side frame plates 70 and 72. Arm 663 is part of a bail 664 (see Figs. 5 and 41) the left arm 665 of which also is rockably mounted on shaft 653. Arm 665 is connected by link 666 with lever 667 pivoted on stud 668 in the left side frame plate 72. A lower extending arm of lever 667 has a stud 669 normally held in the rear end of a slot in link 299 by spring 670. In the normal condition of the machine in which lever 301 is in the position shown in Fig. 5 at the beginning of a cycle in which printing is to be done, that is in the single cycle of an item entering operation or in the second cycle of a total-taking operation, the ribbon guides will be undisturbed in the ensuing machine cycle from their lower position in which a black print is made. As soon as the lower end of lever 301 is drawn forward by depression of the subtract key or by lever 579 (Fig. 23) in negative total operations, link 666 (Fig. 5) is drawn down rocking bail 664 and causing latch 659 (Figs. 16 and 17) to engage with the notch 660 causing the ribbon guides to raise during the first half of the machine cycle so a red print will be made at mid-cycle. Plate 658 also rocks a shaft 671 (see also Fig. 2) each machine cycle to recock the printing hammers.

*Symbol printing*

The right hand printing bar 700 (Figs. 32, 36, 37, 39 and 41) contains seven type-bearing symbols for indicating the kind of operation being performed.

Figures 32, 33, 34, 35:
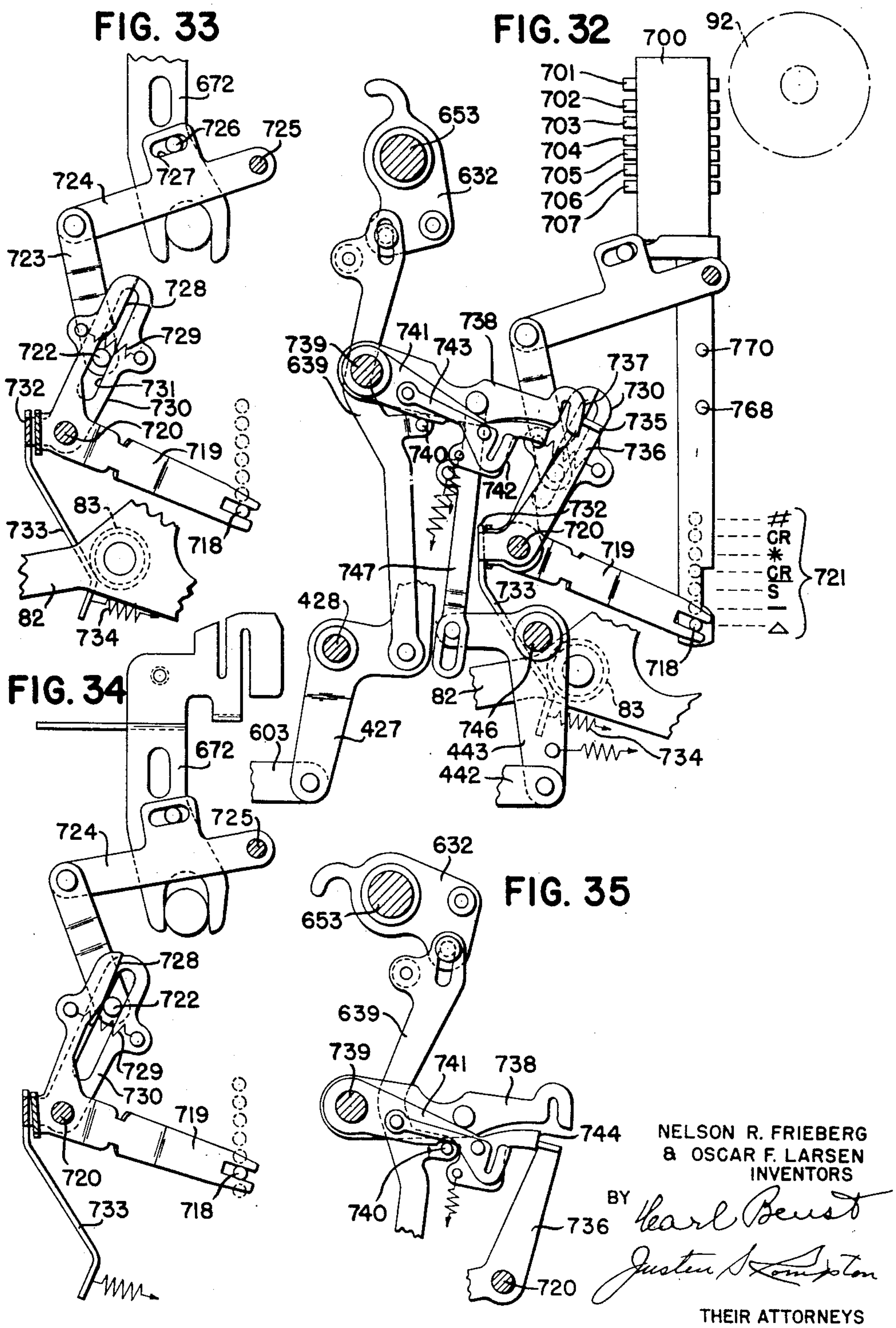
Fig. 32 shows the mechanism for setting the symbol-printing typebar in accordance with the type of machine operation.
Fig. 33 is a detail of the ribbon frame and the linkage whereby its movement in negative entry operations or negative total operations controls the symbol-printing type bar position.
Fig. 34 shows the substance of Fig. 33 moved from a "positive" position to a "negative" position.
Fig. 35 is a detail of a portion of the substance of Fig. 32 as positioned in sub-total operations.

Referring to Fig. 32, the top-most type 701 is for printing the symbol "Δ," which symbol following the print of the first added item following a total-taking operation indicates that the totalizer was clear.

Type 702 bears a minus symbol "—," indicating that the item entered and printed was subtracted. This will be printed in red as described in connection with the ribbon shifting mechanism.

Type 703 prints the symbol "S" indicating the printed item was a sub-total of a positive balance.

Type 704 prints the red symbol "CR" indicating the printed item was a sub-total of a negative balance.

Type 705 prints the symbol "*" indicating the printed item was a total of a positive balance.

Type 706 prints the red symbol "CR" indicating the printed item was the total of a negative balance.

Type 707 prints the symbol "#" indicating an item printed but not entered in the totalizer, i. e. a non-add item.

Fig. 32 shows the symbol bar 700 in lowermost position where type 701 is at the printing station so as to print on an add entry following a total-taking operation. The type bar 700 will be in the same position on subsequent add entries but the printing hammer is latched so no printing operation takes place.

Figures 36, 37:
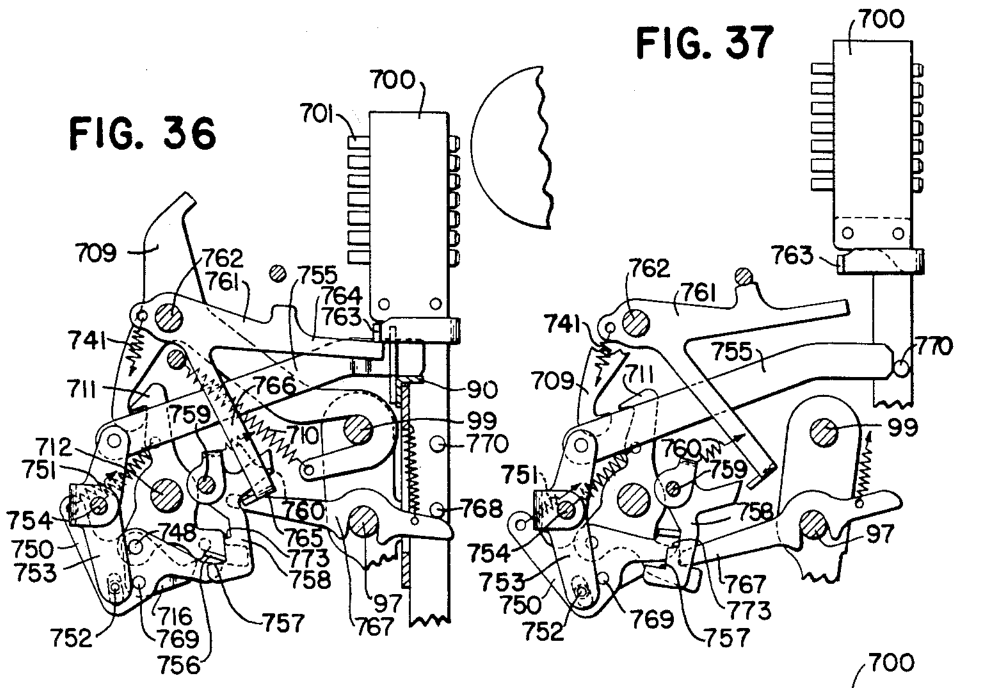
Fig. 36 shows the mechanism for controlling the symbol-printing type bar hammer.
Fig. 37 is a portion of the substance of Fig. 36 in moved position during a total-taking operation.

Fig. 36 shows the symbol hammer control mechanism after the first item entry, be it an add entry or a subtract entry after a total taking.

Symbol printing hammer 709 (Fig. 36) rockable on shaft 99 and urged clockwise by spring 710 is latched by latch member 711 which, when rocked clockwise on shaft 712, supported by the printer frame plates 643 and 644 (see Fig. 41), releases the hammer to print any type which has been positioned at the printing line. The clear symbol "Δ" is printed only after a total operation as will be described, such symbol not being printed though if the first entry after a total is a subtract entry.

Referring to Fig. 32, at the lower end of slide bar 700 is a stud 718 embraced by the forked end of bell crank lever 719 rockable on a shaft-like stud 720 (see Fig. 41) supported by and extending inwardly from the right vertical side frame plate 70. Rocking of lever 719 counter-clockwise from the normal position shown in Fig. 32 causes type bar 700 to rise so stud 718 is positioned to the dotted circle positions 721 in succession. Referring to Fig. 33, lever 719 is held against a stud 722 on link 723 pivoted to lever 724 rockable on stud 725 supported in right printer frame plate 644. Right ribbon guide support plate has a stud 726 which rides in a slot 727 in lever 724. As ribbon guide support plate 672 rises during a subtract operation, a negative total operation, or a negative sub-total operation, stud 722 rides up against surface 728 of bell crank lever 719 causing said lever to rock counter-clockwise a step of movement corresponding to the distance required to raise type bar 700 from one type to the next lower type. Thus, for instance with the lever 719 adjusted, as will be explained, so the clear signal type 701 is in printing position as indicated by the stud 718, the rise of the ribbon guide support plate 672 causing stud 722 to strike surface 728 (see Fig. 34) will cause lever 719 to rock so type 702 will be in printing position as indicated by the new position of stud 718 seen in Fig. 34, which is the minus symbol "—" position as shown at 721 in Fig. 32. Lever 719 receives its principle adjustment through being held against stud 722 by spring 729 anchored to lever 730. Lever 730 has a slot 731 in which stud 722 rides. Lever 730 has a bail portion 732 depending from which is a rocker arm 733 held by spring 734 against stud 83 of link 82 which, as before described, moves rearwardly during the first half of a machine cycle and forwardly to home position during the second half of a machine cycle. On add and subtract operations lever 730 (see Fig. 32) is not permitted to move from home position as a bent-over ear 735 on an arm 736 secured to bail 732 strikes surface 737 on arm 738 pivoted on stud 739 secured in right frame side plate 70. The type bar 700, therefore, will be positioned with the clear sign "Δ" in printing position on add operations and the subtract sign "—" in printing position on subtract operations. On total operations bell crank lever 427 rocks counter-clockwise before printing time causing link 639 to rise. A stud 740 on link 639 raises arm 738 and an arm 741 also pivoted on stud 739 until surface 742 on a bracket 743 secured to arm 741 is in line with the path of movement of ear 735. This causes type bar 700 to rise until the total symbol type 705 is in printing position if the total is positive, or until the negative total symbol type 706 is in printing position if the total is negative. On non-add operations link 442 (see also Fig. 31) is drawn forward, rocking bell crank lever 443 pivoted on stud 746, mounted in right vertical side frame plate 70, causing a link 747 coupled thereto by pin and slot connection to rise. Link 747 at its upper end is pivoted to arm 738 which is thereby lifted allowing ear 735 to move over the top of arm 741 causing the full rise of type bar 700 so the non-add type is in position at the printing line as determined by the contact of the lower end of rocker arm 733 against the roller stud 83.

The symbol type bar hammer 709 (Figs. 36, 37, 38 and 39) is released by the action of interponent 767 striking the latch 711 as shaft 97 rocks forwardly at printing time, if said interponent is in position to do so. In the down position of type bar 700, stud 768 rocks interponent 767 out of effective position, and in all other positions of the type bar the stud 768 is ineffective, allowing interponent 767 to rock counter-clockwise to effective position. In the down position of the type bar the clear symbol "Δ" is in printing position and the only way that the printing hammer can be released is by a coupling set up between the latch 713 of the units order printing hammer and latch 711 of the symbol printing hammer, upon the taking of a total, said coupling being effective only if the next operation is an add operation, or an add operation succeeding one or more non-add operations, immediately succeeding a total-taking operation. Zeros are printed in the units order on all item entering operations when a significant digit is not selected for that order, as will be explained, and such action causes latch 713 of the units order printing hammer to be available to operate the latch 711 for the symbol printing hammer.

In brief, after the coupling has been set up between latch 713 and 711, by a total-taking operation, it is destroyed by any ensuing operation except a non-add operation.

Figure 39:
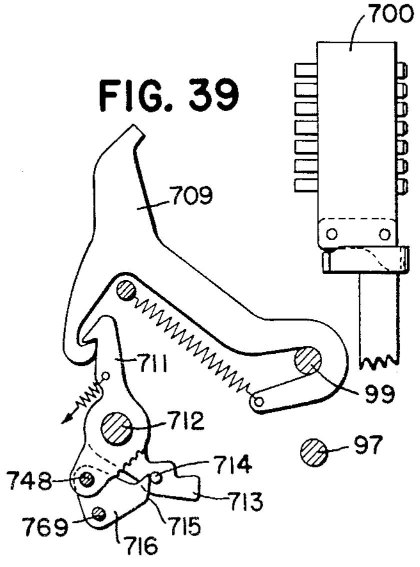
Fig. 39 is a detail view of how the symbol-printing hammer latch mechanism is coupled to the units order printing hammer latch.
Figure 38:
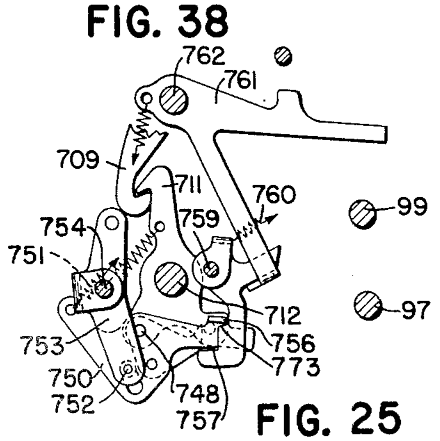
Fig. 38 is a detail of the setting mechanism of Fig. 37 at the end of a total-taking operation.

Referring to Fig. 39, latch plate 716 pivoted on stud 748 to the tail of latch 711 of the symbol printing hammer has a surface 715 which may be brought in front of a stud 714 on latch 713 of the units order printing hammer and held there to couple the latches together so the clockwise release-rocking of latch 713 carries latch 711 with it causing the symbol printing hammer to fire. Latch plate 716 is positioned through its stud 769 which also is held in companion plate 750 also pivoted on stud 748. Plate 750 has an ear 756 which may rest on step 757 of latch lever 758 in which position surface 715 of latch plate 716 is out of engagement with pin 714, or on step 759 thereof, in which position surface 715 is in engagement therewith.

Fig. 36 shows the symbol printing hammer control mechanism as it is disposed following an add entry after a total, in which disposition the printing bar is in its lowest position and latch plate surface 715 is not in engagement with pin 714 on hammer latch 713, because ear 756 is resting on step 757. Latch lever 758 is pivoted on frame-held stud 759 and urged clockwise by spring 760 in which direction it is ordinarily stopped by bent-over ear 765 of arm 766 of lever 761 pivoted on stud 762 and urged to unlatching position by spring 741 which urges it counter-clockwise. The counter-clockwise rocking of lever 761 is controlled by ear 763 on type bar 700 which bears against the upper surface of its arm 764. Type bar 700 never rises far enough to release latch lever 758 unless a total-taking operation or a non-add operation is taking place.

If the type bar 700 rises from its lowest position the interponent 767 will rock latch 711 on the printing operation. Nothing will occur to couple latches 711 and 713 together until a total-taking operation takes place and link 755 comes opposite stud 770 (Fig. 37) on type bar 700. When, now, latch 711 is rocked a stud 752 in lever 753 is held from moving, rocking plate 750 counterclockwise to where ear 756 is above step 759 and latch lever 758 can rock clockwise slightly to hold it there, thus causing latch 716 to do likewise, bringing surface 715 opposite stud 714. Stud 752 is held from moving as shown in Fig. 37 by lever 753 pivoted on stud 754 and pivotally connected to stud 752 at its lower end and pivotally connected to the forward end of link 755 at its upper end. If stud 770 were not opposite the rear end of link 755 the action of spring 751 tending to rock plate 750 clockwise would prevent the coupling of latches 711 and 713. After the total-taking operation, any release of latch 711, whether through the action of the units printing hammer latch or the interponent 767 causes ear 756 to drop back onto step 757 uncoupling latch 711 from latch 713, unless that operation was a non-add operation in which lever 761 is rocked to release position, whereupon latch lever 758 can follow plate 750 on a printing operation, leaving ear 765 on upper step 758.

*Zero printing mechanism*

Figure 25:
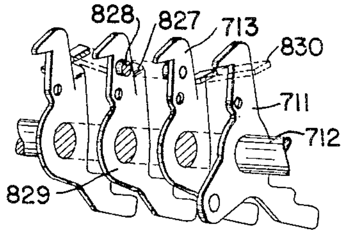
Fig. 25 is a diagrammatic showing of the zero printing control mechanism.

In order to print zeros in each denominational order to the right of the first significant digit when no entry is being made in them under digit key control, each digit printing hammer latch has an ear 827 (Fig. 25) bent to the left and extending across the rear of the printing hammer latch of the next higher denominational order. The left-most printing hammer latch which is operated because of a digit selection in the order will, therefore, carry with it all the digit printing hammer latches to the right, whether or not a digit entry is made in any such lower orders, resulting in the printing of zeros to the right of the first significant digit, as the zero type are alined for printing by the initial unit of movement of the stop bars before the zero stop pawls are struck.

In order to print zeros in the units and tens orders on total and sub-total operations when the totalizer is already clear, the symbol printing hammer latch is used to cause the release of the units and tens order printing hammer latches as the symbol printing hammer latch always is released on total and sub-total operations. A stud 828 secured in the units latch 713 extends into a hole in the tens printing hammer latch, coupling those two latches together. An ear 830 of units latch 713 is bent to the right behind the symbol printing latch 711 so the units and tens latches 713 and 827 are released by the releasing movement of the symbol hammer latch 711, thus printing zeros in the units and tens orders if the totalizer is clear.

*Paper feeding mechanism*

Referring to Fig. 5, platen 92 is secured on a shaft 775 journalled in two support plates 776 and 777 (Fig. 41). Secured on shaft 775 at the left end is a ratchet wheel 778 (Fig. 5). To the side of ratchet wheel 778 and rotatable on shaft 775 is a plate 779 to which is pivoted feed pawl 780 urged into contact with the ratchet wheel by spring 781 but normally held away from the ratchet by contact of tail 782 of the feed pawl with stud 783 extending from plate 776. Link 784, pivoted to plate 779 and having a forked lower end embracing a stud 785, is pulled down to rock plate 779 clockwise whereupon pawl 780 engages the ratchet to turn the shaft and platen in a paper feeding direction. Stud 785 is on a link 786 having a slot 787 in its lower end embracing a stud 788 in side frame plate 72, said stud also acting as the lower anchor of a spring 789 anchored at its top to stud 790 in link 786. Cam surface 791 on the foot of link 786 is held in contact with roller stud 792, supported by a plate secured to shaft 55, by spring 789. As stud 792 rocks downwardly on the first half of a machine cycle, link 786 follows, except as will be noted, giving pawl 780 a non-feed movement around ratchet wheel 778 and, on the upward movement of said stud on the second half of the machine cycle link 786 is raised to home position giving the platen the paper feeding movement. The extent to which link 786 is allowed to follow stud 792 determines the extent of the paper feed.

Pivoted to the upper end of link 786 is a lever 793 pivotally mounted on the left end of shaft 806. A bent-over ear 795 has a slot which rides the vertical edge of guide 796 for lateral support of lever 793. A bent-over ear 797 cooperates with a stepped plate 798 (see also Fig. 8) positioned by lever 33 (see Fig. 1) so that the rearmost position of lever 33 lever 793 will be allowed to move a distance equal to one line space, in the next postion forward lever 793 will be allowed to move a distance equal to two line spaces, and in the complete forward position plate 798 is moved from under ear 797 and a plate 799 (Fig. 5) mounted on shaft 653 and urged clockwise by spring 800 follows plate 798 to a point where its surfaces 801 is under ear 797 permitting lever 793 to move a distance equal to one line space each item entering machine operation. However, plate 799 is rocked counter-clockwise by downward movement of bail 802 rockable on shaft 653, such downward movement occurring on the second cycle of a total-taking operation and making contact with a rearwardly extending tail of plate 799. This removes surface 801 from under ear 797 and lever 793 is permitted to move a distance equal to six line spaces so the record material is fed so the just-printed total is above a tear-off bar 803 (see Fig. 1). Referring to Fig. 41, the right end of bail 802 is pivoted by stud 804 to a slot in an arm of a bail 805 rockably mounted on shaft 806 extending between the side frame plates 70 and 72. The right arm 807 of bail 805 is pivoted to link 808 (Fig. 8) coupled by a double pin and slot sliding connection to link 809 which in turn is pivoted to the upper end of lever 427 (see Fig. 27) which lever is rocked so as to force link 809 upwardly and hold it there during the paper feeding period of a total taking operation. Spring 810 holds links 808 and 809 in extended relation as shown in Fig. 8 to effect the rocking of bail 805. If bail 805 is held from movement so is link 808 and upward movement of link 809 is lost in the stud and slot connection between links 808 and 809. Referring to Fig. 4, arm 807 of bail 805 has a stud 810 embraced by hook 811 of plate 632, as it is rocked counter-clockwise during a sub-total taking operation, preventing bail 805 from being rocked by link 808, the motion of link 809 being taken up in the stud and slot connection between links 808 and 809. Thus, the extra feed of the paper is not given on sub-total operations.

*Control key interlocks*

Referring to Fig. 6, sliding locking plates 812, 813, 814 and 815 are mounted by stud and slot couplings to bracket 225 and are arranged so that there is one plate between each adjacent pair of the control keys 27, 26, 25, 24 and 28. If a key, for example key 24, is depressed a stud 816 thereon descends between plates 814 and 815, forcing plate 815 forwardly and plates 812, 813 and 814 rearwardly where they are held until key 24 is restored. Under such circumstances keys 27, 26, 25 and 28 cannot be depressed if the studs thereon, corresponding to stud 816, strike the upper edges of the locking plates forced thereunder. This type of crowding interlock is will known in the art.

Fig. 7 shows a lever 460 having a slot 817 by which it is mounted on stud 818, in the machine base. Lever 460 is held by spring 819 so that its right end 820 is held in the forward end of a slot 821 (see Fig. 3) in link 546 drawn rearwardly in operation of either the total key or the sub-total key. Locking plate 822 rockable mounted on stud 823 is rocked counter-clockwise by subtract key rocked plate 293 acting on an upwardly extending arm of plate 822 bringing a surface of plate 822 in the path of movement of right end 820 of lever 460 preventing an operation of either the total key or sub-total key during a subtract operation, and bringing a surface 825 under ear 826 of lever 103 preventing the machine being released by the add key 24 on such operation. On total and sub-total operations lever end 820 is moved rearwardly by link 546 preventing the rocking of plate 822 and therefore, preventing operation of the subtract plate 293 which must rock plate 822 to move.

From the foregoing description of the machine it is apparent that item entries may be made additively by operation of the digit keys in conjunction with the "add" key, that item entries may be made subtractively by operation of the digit keys in conjunction with the "subtract" key, that operation of the "total" key will cause the machine to automatically print the true total be it positive or negative, that operation of the "sub-total" key will cause the machine to print the true sub-total be it positive or negative, that subtract entries and negative totals and sub-totals are printed in red followed by appropriate symbols, that the first add entry following a total-taking operation, as printed, is followed by an appropriate "clear" symbol, and that subtract entries are followed by an appropriate symbol. Control key interlocks are provided to prevent misoperation of the machine and the balance in the totalizer may be seen on indicators at any time, positive balances being readable directly and negative balances being readable as a complement to a negative zero base.

While the form of mechanism herein shown and described is admirably adapted to fulfill the objects primarily stated, it is to be understood that it is not intended to confine the invention, to the one form or embodiment herein disclosed, for it is susceptible of embodiment in various other forms.

What is claimed is:

1. In a machine of the class described, the combination of a main operating means operable in machine cycles; a totalizer having a series of denominational order elements into which amounts may be entered additively or subtractively; mechanism for entering a unit of data in the lowest order element of the totalizer when the highest order element of the totalizer passes through zero on an amount entry accompanied by a change in the algebraic sign of the amount in the totalizer; amount selecting devices; differential means operable on a cycle of operation for entering the amount selected on the selecting devices into the totalizer; add control means operable to cause an operative cycle of the machine and the entry of the selected amount into the totalizer additively; subtract control means for causing an operative cycle of the machine and the entry of the selected amount into the totalizer subtractively; total control means operable to cause a two-cycle operation of the machine in which the amount in the totalizer is removed and set up in the differential means, be it positive or negative; sub-total control means operable to cause a two-cycle operation of the machine in which the amount in the totalizer is removed, set up in the differential means and replaced in the totalizer be it positive or negative; an amount printer having denominational type carriers and operable in amount entering cycles and in the second cycle of total or sub-total operations for printing the amount entered into or removed from the totalizer, including means for causing the printing of negative amounts in a distinguishing color; non-add control means operable to cause an operative cycle of the machine in which a selected amount is set up in the differential and printed but not entered into the totalizer; a symbol type carrier having a separate type for each of the operations of adding an amount which is the amount first entered after a total-taking operation, an entry of a negative amount, a sub-total of a positive amount, a sub-total of a negative amount, a total of a positive amount, a total of a negative amount, and a non-add operation, said type carrier being moved to bring to a printing station, during a given operation, the type representing such operation, and said type carrier having a formation thereon; printing actuating means operated in a subtract amount entering or non-add operation cycle and in the second cycle of a total or sub-total operation to cause the symbol type associated with such operation to print; normally ineffective means to operate the symbol printing actuating means but rendered effective during a total-taking operation, by reason of the position of the formation on the symbol type carrier in such total-taking operation, for use in a subsequent operation, said means being rendered ineffective if the operation next subsequent to a total-taking operation is a subtract operation or a sub-total operation whereby a symbol appearing after an added amount indicates the totalizer has previously been cleared.

2. The device of claim 1 in which the means to operate the symbol printing means on an add amount entering operation following a total operation is a normally ineffective coupling between the printing actuator for the lowest denominational amount type carrier and that for the symbol type carrier, said coupling being made each total taking operation and broken on every other printing operation except in a non-add operation.

3. The device of claim 1 in which the symbol printing mechanism includes a hammer cocked and latched by a latch at the conclusion of a machine operation in which it is operated; a means moved each machine cycle to fire the printing hammer; an interponent normally in position between the moving means and the hammer latch to render the moving means effective to fire the printing hammer; and means cooperating with the formation on the symbol type carrier which rocks the interponent to ineffective position when the symbol type carrier is positioned for add operations.

4. The device of claim 1 in which the printing means includes a latched printing hammer for each denominational order type carrier and one for the symbol printing type carrier, in which the printing hammer of a denominational order is unlatched and fired during a machine operation in which the associated type carrier has been positioned to print an amount, in which an unlatching of a printing hammer latch of a denominational order unlatches the printing latches of all lower orders to print zeros if no amounts are selected in any of those orders, a stud carried by the printing hammer latch of lowest order, a latch piece pivoted to the symbol printing hammer so it may be swung in front of the stud but which is normally held away therefrom; and means operable by the symbol printing hammer latch and conditioned by the position of formation on the symbol printing type carrier to swing the latch piece in front of the stud and hold it there at the end of a total-taking operation, said latch piece being free to swing to ineffective position on any subsequent amount entering operation.

5. In a machine of the class described having a main driving means; means to release the main driving means to cause the machine to have a cycle of operation for amount entering, said release means tending to relatch, and normally relatching at the end of a machine cycle; a total key; a total control plate rocked through a disconnectable link upon operation of the total key, said plate in rocking releasing the machine for the first cycle of a two-cycle machine operation; a power link given a sliding movement back and forth each machine cycle; a total control link; a normally ineffective latch for coupling the power link to the total control link for sliding movement together; means coupled to the total control plate which when the total control plate is moved permits the latch to move to coupling position so on the movement of the power link to home position during the second half of the first machine cycle the total control link moves therewith; a holding piece normally urged to hold the machine released; a latch piece moved during the last half of the first cycle by movement of the total control link allowing the holding piece to move to hold the machine released and to hold the total control link and total plate in moved position; means disconnecting the disconnectable link near the end of the first machine cycle; means carried by the main driving means to give the holding means a movement to its ineffective position near the end of each machine cycle said holding piece returning immediately at the close of the first cycle to moved position to hold the machine released; means always resiliently urging the total plate and latch coupling the power link and total control link to home position, said means being effective so to do during the first half of the second machine cycle by reason of relative movement between the power link and the total control link, said movement of the total plate to home position positioning the disconnectable link so it may be coupled to the total key when the total key is returned to home position at the end of a machine operation.

6. The machine of claim 5 in which a subtotal key is provided which when operated operates the total key causing the machine to perform two cycles of operation.

7. The machine of claim 6 in which the subtotal key is held in operated condition until the end of a two-cycle machine operation.

8. The machine of claim 5 in which the total key is held operated until the end of a two-cycle machine operation.

9. In the machine of the class described, the combination of a main operating means for giving the machine cycles of operation; a totalizer including a series of denominational pinions each having an add pawl and a subtract pawl, the add pawls acting as zero stops in taking positive totals and the subtract pawls acting as zero stops in taking negative totals; a lever for each pinion, each having a stop surface used in conjunction with the add pawls in positive total-taking operations and each having a stop surface used in conjunction with the subtract pawls in negative total-taking operations; means to shift the totalizer pinions to one position or another so as to cooperate with the levers so the add pawls are in position to be stopped by their associated surfaces on the levers or so the subtract pawls are in position to be stopped by their associated surfaces on the levers; means to sense whether the totalizer contains a positive amount or a negative amount; and a total key which, when operated, causes a machine operation to commence, and sets the totalizer shifting means so the totalizer is positioned by the main operating means to positive total position when the total is positive and to negative total position when the total is negative, unless already so positioned.

10. The device of claim 9 in which a sub-total key is provided to control sub-total operations and its operation causes operation of the total key also.

11. In a machine of the class described, the combination of a main operating means; a totalizer; means to enter data into the totalizer additively or subtractively; means to take sub-totals, either positive or negative; means to take totals, either positive or negative; a symbol type carrier having spaced thereon separate symbol type for add operations, subtract operations, sub-total operations, negative sub-total operations, total operations, negative total operations, and non-add operations, in the order named; a platen having a printing station; drive means constantly urging the type carrier to move from a normal position in which the add operation symbol type is at the printing station toward the position where the non-add operation symbol type is at the printing station, said drive means being arrested at normal position by the main operating means when the machine is at rest but releasing the drive means during a machine operation; a first movable stop also arresting the drive means in normal position unless the stop is moved; a second movable stop having a stop surface against which the drive means may be stopped to position the type carrier so the sub-total operation symbol type is at the printing station and another stop surface against which the drive means may be stopped for positioning the total operation symbol type at the printing station; a sub-total key which, when operated, moves both stops so the sub-total operation stop surface is positioned to stop the drive means; a total key which when operated moves both stops so the total operation stop surface is positioned to stop the drive means; and a non-add key operation of which moves the stops so neither stop is effective whereby the type carrier moves to where the non-add operation symbol type is at printing position when the driver is released by the main operating means.

12. The device of claim 11 in which the drive means is caused to move an extra distance toward the non-add position equal to the space between two symbol type whenever a negative amount is entered into or taken from the totalizer.

13. The device of claim 12 in which the machine has a shiftable type ribbon which is shifted to print the symbols in a distinctive color on operations whenever negative data is entered into or removed from the totalizer and in which the extra step of movement of the symbol type carrier in such operations is caused by the shifting of the type ribbon.

14. In a calculating machine having a totalizer; amount printing means; and controls by which in a machine operation amounts may be entered into the totalizer and printed, by which in a machine operation amounts may be printed without being entered into the totalizer, and by which in a machine operation totals and subtotals may be taken and printed; the combination of a symbol type member having a plurality of characters arranged thereon, the characters each representing a kind of machine operation, including the operation of amount entering after a total has been taken to represent the totalizer is clear, the operation of total-taking, and the non-add operation of amount printing without entry of such into the totalizer, among others, and said symbol type member being normally positioned so the "clear" character is in printing position and said type member being positionable by mechanism, including the controls, during a machine operation, to bring to printing position the type symbol representing the kind of operation being performed; symbol printing means including a movable interponent member normally effective to cause a symbol positioned at printing position to print during the machine operation in which it was positioned, said symbol printing means being disabled by moving the interponent when the symbol representing that the totalizer is clear is in printing position; a second symbol printing means including a latch normally ineffective but rendered effective through a formation on the symbol type member by the taking of a total so that, if the symbol type member is in position where the symbol representing the totalizer is clear is in printing position on the next machine operation, said clear symbol will be printed.

15. The machine of claim 14, in which the second symbol printing means, when in effective condition, will be rendered ineffective by the next machine operation unless it is a non-add operation.

16. The device of claim 14, in which the symbol type member is caused to print by the release of a normally latched but potentially energized printing hammer through action of the interponent, in which a lowest amount order printing member is caused to print by release of a printing hammer normally latched in energized position, in which, on an operation of the machine the printing hammer for the lowest amount bank is unlatched and caused to print, and in which the printing hammer latch for said lowest amount bank is coupled, during a total-taking operation, to the symbol printing hammer latch, so that when the lowest amount bank latch is moved to unlatched position it carries the symbol printing latch with it, releasing the symbol printing hammer.

17. The device of claim 16 in which the coupling between the printing hammer for the lowest amount bank and the printing hammer for the symbol type bar is broken at the first operation after a total-taking operation, unless it be a non-add operation.

NELSON R. FRIEBERG.
OSCAR F. LARSEN.

References Cited in the file of this patent

UNITED STATES PATENTS

| Number | Name | Date |
|---|---|---|
| Re. 13,539 | Lotterhand | Mar. 4, 1913 |
| 940,758 | Wales | Nov. 23, 1909 |
| 989,353 | Harrison, Jr. | Apr. 11, 1911 |
| 1,015,227 | Harrison | Jan. 16, 1912 |
| 1,209,817 | Dorman | Dec. 26, 1916 |
| 1,294,704 | Reirdon | Feb. 18, 1919 |
| 1,355,258 | Pentecost | Oct. 12, 1920 |
| 1,386,021 | Peters | Aug. 2, 1921 |
| 1,854,875 | White | Apr. 19, 1932 |
| 1,938,907 | Hosack | Dec. 12, 1933 |
| 1,947,512 | Barrett | Feb. 20, 1934 |
| 2,428,084 | Lambert | Sept. 30, 1947 |